United States Patent [19]

Mazer et al.

[11] Patent Number: 5,306,810

[45] Date of Patent: Apr. 26, 1994

[54] SEPARATION OF MANGANESE FROM RICE PROTEIN USING ALUMINA

[75] Inventors: Terrence B. Mazer, Reynoldsburg; Christy A. Nardelli, Westerville; Arthur J. C. L. Hogarth; Andre Daab-Krzykowski, both of Columbus, all of Ohio

[73] Assignee: Abbott Laboratories, Abbott Park, Ill.

[21] Appl. No.: 72,165

[22] Filed: Jun. 7, 1993

Related U.S. Application Data

[62] Division of Ser. No. 811,102, Dec. 20, 1991, Pat. No. 5,248,765.

[51] Int. Cl.$^5$ .............................. A23J 1/12; A23J 1/14; A23J 3/14
[52] U.S. Cl. ................................... 530/372; 530/370; 530/377; 530/378; 530/379; 426/656
[58] Field of Search ............... 530/372, 370, 377, 378, 530/379; 426/656

[56] References Cited

U.S. PATENT DOCUMENTS

| | | | |
|---|---|---|---|
| 2,732,395 | 1/1956 | Bolley et al. | 558/144 |
| 3,728,327 | 4/1973 | Frazer et al. | 530/378 |
| 3,733,207 | 5/1973 | McCabe | 426/46 |
| 3,736,147 | 5/1973 | Iocobucci et al. | 530/377 |
| 3,995,071 | 11/1976 | Goodnight, Jr. et al. | 426/598 |
| 4,072,670 | 2/1978 | Goodnight, Jr. et al. | 530/378 |
| 4,088,795 | 5/1978 | Goodnight, Jr. et al. | 426/598 |
| 4,091,120 | 5/1978 | Goodnight, Jr. et al. | 426/598 |
| 4,212,799 | 7/1980 | Nuzzolo et al. | 530/377 |
| 4,375,431 | 3/1983 | Bradford et al. | 530/378 |
| 4,697,004 | 9/1987 | Puski et al. | 530/378 |

FOREIGN PATENT DOCUMENTS

WO9008476 of 1990 PCT Int'l Appl. .
WO9207474 of 1992 PCT Int'l Appl. .
1574110 of 1980 United Kingdom .

OTHER PUBLICATIONS

"Effect of Local Food Processing on Phytate Levels in Cassava, Cocoyam, Yam, Maize, Sorghum, Rice, Cowpea, and Soybean", Marfo et al., Journal of Agriculture and Food Chemistry, 38:1580–1585 (1990).

"Studies on the Preparation of Soy Protein Free from Phosphorus", McKinney et al., Journal of Biological Chemistry, 178:117–132 (1949).

"Phytate-Protein Interactions in Soybean Extracts and Low-Phytate Soy Protein Products", deRham et al., Journal of Food Science, 44:596–600 (1979).

"Association of Zinc with Soy Proteins as Affected by Heat and pH", Khan et al., Journal of Food Science, 55:263–266 (1990).

"Phytate Removal from Soy Protein Isolates Using Ion Exchange Processing Treatments", Brooks et al., Journal of Food Science, 47:1280–1282 (1982).

"Ultrafiltration Studies of Foods: Part 1–The Removal of Undesirable Components in Soymilk and the Effects on the Quality of the Spray-dried Powder", Ang et al., Food Chemistry, 20:183–189 (1986).

"New Ceramic Titania: Selective Adsorbent for Organic Phosphates", Hisashi et al., Analytical Sciences, 61:911–912 (1990).

Primary Examiner—Michael G. Wityshyn
Assistant Examiner—C. Sayala
Attorney, Agent, or Firm—Lonnie R. Drayer; Donald O. Nickey

[57] ABSTRACT

A method for separating phytate and manganese from protein and dietary fiber involves treatment of an aqueous slurry of phytatecontaining material at a low pH with insoluble alumina. In a batch treatment process the pH of the solution is increased, leaving phytate units attached to the alumina while freeing the protein and dietary fiber. In a column treatment process, the column containing alumina is rinsed, after the low pH treatment, with dilute acid and water to recover the protein and/or dietary fiber. This method may be employed either during the manufacture of protein and fiber isolates from flour or flakes, or for removing phytate from commercially available protein and fiber commodities. The spent alumina may be readily regenerated and reused. A method of separating manganese from rice protein using this same technology is also disclosed.

6 Claims, 12 Drawing Sheets

SEPARATION OF MANGANESE FROM RICE PROTEIN USING ALUMINA

This is a divisional application Ser. No. 07/811,102 filed on Dec. 20, 1991, now U.S. Pat. No. 5,248,765.

FIELD OF THE INVENTION

The present invention relates generally to a method of separating phytate and manganese from protein and dietary fiber and more particularly to a method of using alumina to separate phytate from protein and dietary fiber and to nutritional products containing the protein and dietary fiber isolated by said method.

BACKGROUND OF THE INVENTION

It is desirable to remove manganese from rice protein because the inherent level of manganese in rice alone may be greater than the total desired in a nutritional product, such as a liquid nutritional formula for infants.

Phytic acid, also known as inositol hexaphosphate, is a myo-inositol molecule in which all the hydroxy groups have been replaced by phosphate groups as shown in FIG. 1. Phytic acid is the source of up to 85% of the total phosphorus in many cereals and legumes. Phytate is the salts of phytic acid. Phytic acid is believed to reduce the bioavailability of essential minerals by forming complexes with them. Also, it may influence the functional and nutritional value of proteins.

Aluminum is known to form complexes with phosphates. Classically, aluminum sulfate, commonly known as alum, has been used to remove inorganic phosphates in water purification processes. Alumina (aluminum oxide, $Al_2O_3$) is insoluble in water, practically insoluble in organic solvents, and only slightly soluble in aqueous alkaline solutions with the formation of hydroxides. The ability of the aluminum portion of the aluminum oxide to attach to the phosphate portion of phytate was the theoretical and practical basis for its initial experimental use in the reduction of phytate in proteins.

PRIOR ART

In a typical commercial process, soy proteins are extracted at slightly alkaline pH from defatted soy flake or defatted soy flour. The major protein fraction is then precipitated from the clarified extract by adjusting the pH to the isoelectric point of the proteins (pH 3.8 to 6.0). Inasmuch as the proteins are insoluble at this pH the protein curd can be separated from soluble sugars, salts, etc., by centrifugation. To complete the purification, the protein curd is washed with water at least once at this isoelectric pH, then the protein is spray-dried either as is or after resuspension at neutral pH. Under such prior art conditions, a major portion of the phytate present in the soy flour will complex with the protein and will be present in the soy isolate. Commercial soy isolates typically have a phytate content of 2.0–2.5% and in some instances as much as 3% by weight.

The prior art contains many examples of methods of separating phytic acid, and phytates, from protein. The desirability of an economical method of separating phytates from the more nutritional components of a food, such as maize, rice, sorghum, cowpea, soybean, cassava, coyam and yam is well established, see for example "Effect of Local Food Processing on Phytate Levels in Cassava, Cocoyam, Yam, Maize, Sorghum, Rice, Cowpea, and Soybean", Marfo et al., *Journal of Agriculture and Food Chemistry*, 38:1580–1585 (1990).

Bolley et al., U.S. Pat. No. 2,732,395, teaches a method for separating phytic acid from various oil seeds with an aqueous acid extraction at a pH near the isoelectric point of the protein (about 4.5). The phytic acid is partly dissolved at this pH and is recovered. The protein is recovered by solubilizing it at an alkaline pH, separating the insoluble portion, and precipitating the protein at a pH near the isoelectric point. The resulting protein fraction contained as much as 4% organic phosphorus, which is an indicator of a high phytate content.

"Studies on the Preparation of Soy Bean Protein Free from Phosphorus", McKinney et al., *Journal of Biological Chemistry* 178:117–132 (1949), teaches that phytic acid dissociates from soy protein at pH values between 11.0 and 11.5 and forms a precipitate that may be removed by centrifugation.

Goodnight et al., U.S. Pat. No. 4,072,670, teaches that an alkalistable complex is formed between protein and phytic acid in the acidic conditions used by Bolley et al. In an attempt to overcome this disadvantage, Goodnight et al. teaches precipitation of the phytate at pH values a little higher than those described by McKinney et al., i.e., pH values between 11.6 and 14. Phytate is then separated from the protein prior to protein precipitation at the protein isoelectric point of pH 4.5. One disadvantage of the Goodnight et al. process is that exposing proteins to such an extremely alkaline pH adversely affects the nutritive value of the protein. Also, there is a tendency to increase the undesirable formation of lysinoalanine. In addition, continuous centrifuges employed in industrial applications are unable to separate the very light phytate precipitate formed at such a high pH.

Goodnight et al., U.S. Pat. No. 4,088,795 teaches the removal of phytate by rendering the phytate insoluble at pH 10. This high of a pH is detrimental to protein. The insoluble protein is separated by centrifugation, then ultrafiltration. However; in the ultrafiltration step the protein is in the retentate. Goodnight et al., U.S. Pat. No. 3,995,071 teaches basically the same method as U.S. Pat. No. 4,088,795 with additional heat treating steps, as well as a recipe for soy milk containing a protein isolate.

Goodnight et al., U.S. Pat. No. 4,091,120 teaches the ultrafiltration of a material containing soy protein which has already been extracted and centrifuged. During ultrafiltration the protein is collected in the retentate while carbohydrates and minerals are passed into the permeate. In this patent Goodnight et al., al so teach formulations for nutritional products containing soy protein isolated by the process taught therein.

deRham, UK Patent No. 1,574,110, teaches methods by which the phytic acid content of a soy protein isolate can be decreased to be in the range of 2% to 0.6%, when protein precipitation from neutral soy extract (extracted at pH 8.0) is performed at pH 5.7 instead of pH 4.5. When soy proteins are extracted at pH 2.5 and recovered at pH 4.5 the phytic acid content is reported to be 1.7%. By performing the precipitation at pH 5.5, the phytic acid content was reportedly decreased to 0.7%. The phytic acid concentration of the isolate could be decreased to 0.2% by extracting the protein at pH 11.5 and recovering it at pH 5.5. However, these methods suffer from various drawbacks, i.e. protein yield is decreased by as much as 20%, which renders them commercially impracticable.

"Phytate-Protein Interactions in Soybean Extracts and Low-Phytate Soy Protein Products", derham et al,

*Journal of Food Science* 44:596-600 (1979), teaches that calcium ions enhance the precipitation of soy protein at pH 11.5. Very low phytic acid concentrations could be achieved by extraction with 10% NaCl, but these methods produced a protein isolate which is effectively unusable without desalting by dialysis or ultrafiltration. Moreover, the protein yield according to these methods is low.

"Association of Zinc with Soy Proteins as Affected by Heat and pH", Khan et al., *Journal of Food Science* 55:263-266 (1990), at page 264 points out that one shortcoming of Goodnight et al. and derham et al. is that unless most of the phytate is removed by centrifugation at pH 12.0 prior to acid precipitating the protein, isolated soy protein should be supplemented with zinc when it is the main source of zinc in the diet.

Puski et al., U.S. Pat. No. 4,697,004, teaches a soy protein preparation method in which proteins are extracted at a pH of 8 to 10 and at a temperature above 65° C. The protein product contains less than about 0.3% phytic acid. Again, however, such high temperatures adversely affect the solubility and other functional properties of the proteins.

"Phytate Removal from Soy Protein Isolates Using Ion Exchange Processing Treatments", Brooks et al., *Journal of Food Science* 47:1280-1282 (1982), teaches a method for phytate removal from soy protein isolates using ion exchange treatments. A combination of cation and anion exchange processes is required for effective phytate removal. A dialysis step is used to remove other nonprotein components. This method, however, would be unacceptably complex and expensive for use on a commercial scale.

Enzymes, such as phytase, also have been used in the preparation of soy protein isolates. For example, McCabe, U.S. Pat. No. 3,733,207, teaches the preparation of a soluble protein fraction having a decreased phytic acid content. Proteins are solubilized in alkaline conditions, and wheat phytase is added after lowering the pH to about 5. The protein fraction not precipitated at pH 4.5 is recovered. The resulting protein, because of its solubility in acidic conditions, is suitable for carbonated beverages. The enzyme treatment is long, however, requiring 24-36 hours. The phytic acid content of the protein is not reported in the patent.

Published PCT Application WO 90/08476 teaches a method of producing a phytate free, or low phytate, soy protein isolate using the enzyme phytase.

Iacobucci et al, U.S. Pat. No. 3,736,147, teaches a method of reducing phytate concentration in soy protein involving various chemical treatments in combination with ultrafiltration. The chemical treatments include hydrolysis of phytic acid by indigenous phytase at neutral pH, ultrafiltration in the presence of calcium ions at low pH, or the use of Ethylenediamine Tetraacetic Acid (EDTA) at high pH. The methods taught by Iacobucci et al. have several disadvantages. Soy globulins are known to dissociate into subunits and to be denatured at such low pH values. The use of calcium ions at low pH values requires an additional ultrafiltration step for salt removal. The high temperature (65° C.) in the phytase method may decrease the solubility of the protein on either side of the isoelectric point. The lowest phosphorous content achieved is not less than 0.2%, which corresponds to 0.7% phytic acid. The methods employ very time-consuming 18-48 hour ultrafiltrations.

Several publications, for example U.S.A. patent 3,728,327, contain descriptions of attempts to separate phytates from protein using ultrafiltration, but repeatedly the protein was captured in the retentate, so that either no separation was achieved or only a minor amount of separation was achieved. These separation processes were attempted not only with soybeans and soy milk, but also peanuts, cottonseed, and other vegetable sources of protein. "Ultrafiltration Studies of Foods: Part 1- The Removal of Undesirable Components in Soymilk and the Effects on the Quality of the Spray-dried Powder", Ang et al., *Food Chemistry*, 20:183-189 (1986).

U.S. Pat. Nos. 4,212,799, and 4,375,431 teach the use of various forms of aluminum to bind or separate materials in protein containing substances. In each instance, the aluminum is left as an ingredient of the resultant material. It is believed that intentionally adding bound or unbound aluminum to a food substance is highly undesirable because there is some evidence that the aluminum could cause health problems.

The prior art illustrates that considerable effort has been expended to develop methods to reduce the phytic acid content of soy protein. These methods, however, have suffered from various drawbacks, including inefficient phytic acid reduction, high cost, long treatment time requirements, unacceptable alterations of the treated protein, addition of aluminum to foodstuff, and incompatibility with commercial soy protein processing techniques and equipment. As a result, there continues to be a need for an improved method of producing phytate-free or low phytate isolates and concentrates of protein and dietary fiber which avoid these drawbacks.

The present invention comprises a novel and unobvious method through which low-phytate isolates and concentrates of plant protein and dietary fiber may be prepared. The invention further comprises lowphytate soy protein isolates and dietary fiber produced according to the methods and processes of the present invention and the products containing the protein isolate and dietary fiber so produced.

BRIEF DESCRIPTION OF THE DRAWINGS

The features of the present invention which are believed to be novel are set forth with particularity in the appended claims. The present invention, both as to its structure and manner of operation, may best be understood by reference to the following detailed description, taken in accordance with the accompanying drawings in which:

DETAILED DESCRIPTION OF THE INVENTION

Figure 1:
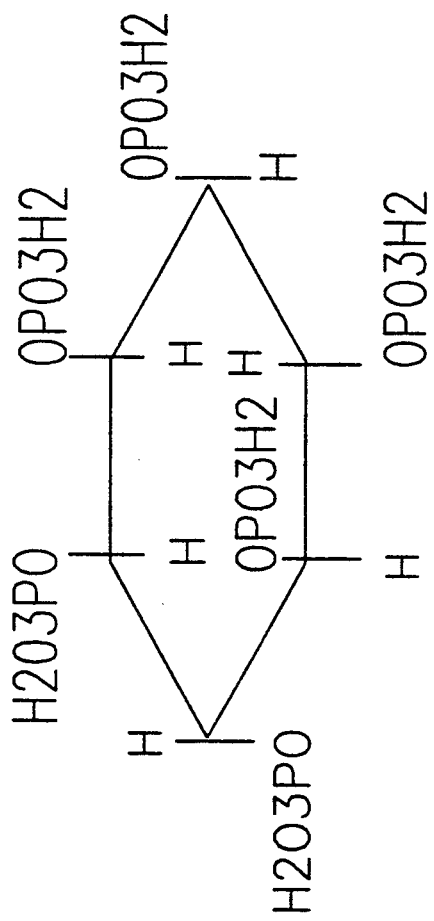
FIG. 1 is a pictorial representation of the chemical structure of a phytic acid molecule.

When the term "phytate" is used herein and in the claims, it is understood to include salts of phytic acid or molecular complexes of phytic acid with other constituents of a food product. Phytic acid, the hexaorthomonophosphate ester of myo-inositol, occurs at fairly high levels in grains and oil seeds as the calcium magnesium salt, phytin. In soybean meal, roughly 70% of the total phosphorus is accounted for by phytin. Phytic acid will form complexes of phytate-mineral-protein and phytate-mineral-dietary fiber during processing which has been shown to reduce the bioavailability of various minerals, such as zinc, magnesium, calcium, iron, etc. During the preparation of protein isolates according to conventional methods much of the phytic acid and phytates remain associated with the protein and dietary fiber in the form of complexes. Phytate removal from plant protein sources and dietary fiber is desirable because phytate phosphorous is not bioavailable as a nutritional entity to humans and it interferes with the absorption of nutritionally essential multivalent cations, such as calcium, iron and zinc. Therefore, it is desirable to eliminate or reduce the phytate content of protein and dietary fiber sources.

Numerous types of dietary fiber are currently available. Basically, dietary fiber passes through the small intestine undigested by enzymes and is a kind of natural and necessary laxative. As used herein and in the claims "dietary fiber is understood to be all of the components of a food that are not broken down by enzymes in the human digestive tract to produce small molecular compounds which are then absorbed into the bloodstream. These components are mostly celluloses, hemicelluloses, pectin, gums, mucilages, lignin and lignin material varying in different plants according to type and age. These fibers differ significantly in their chemical composition and physical structure and subsequently their physiological function.

There is disclosed herein a method for separating phytate from flakes and flours which contain plant protein and dietary fiber which is: (a) effective - with up to 100% phytate removal ; (b) quick requiring less than 1 hour; and (c) very cost-effective - with a cost of pennies per pound of protein. Additionally an excellent yield is achieved. For example, between 87% and 100% of the soy protein from soy flour is recovered using the method disclosed herein. The method disclosed herein has been demonstrated on soy and rice protein and dietary fiber, and can be used with commercial commodity proteins, or in otherwise conventional methods of isolating proteins and/or dietary fibers from flour or flakes. There is also evidence that alumina may be helpful in trace metal reduction in proteins and other materials. For example, the removal of manganese from rice protein is another potential application for the method disclosed herein.

The method has been demonstrated utilizing a "batch treatment" and "column treatment" processes, but it is believed that a preferred embodiment will employ column technology.

According to one aspect of the invention disclosed herein a batch treatment method involves treating a slurry containing vegetable protein and/or dietary fiber with alumina at room temperature and at a low pH. The pH is then raised to solubilize the protein, and, in the case of a flour slurry, the dietary fiber is removed. The soluble protein is then precipitated by lowering the pH to the protein's isoelectric point (4.5 for soy protein), and the protein can then be used as a "wet curd", or dried for later use.

According to a second aspect of the invention disclosed herein a column treatment method involves passing a continuous stream of a slurry (rather than a discrete amount in a container) through a column containing alumina. The slurry entering the column has a low pH the pH remains low throughout the process. After the stream has passed through the column, the alumina is treated with an acidic solution to flush protein from the column.

The alumina itself may be used repeatedly. There are few, if any, waste disposal problems associated with the alumina treatment process. Additionally, it is possible that myo-inositol, another commodity which is nutritionally significant, may be recovered from the alumina conditioning streams with a phytase enzyme treatment.

While any flour or protein isolate containing vegetable protein and/or dietary fiber may be used in the slurry, preferably the source of the vegetable protein is at least one plant selected from the group of plants consisting of maize, rice, sorghum, cowpeas, soybeans, cassava, coyam, peas, peanuts, oat, wheat, sunflowers, sesame, cotton, beans Jerusalem artichoke and yams. In the most preferred embodiments a flour comprising defatted soy flour or defatted soy flakes or a soy protein isolate is used in the slurry. As used herein and in the claims "defatted soy flour" is understood to mean both defatted soy flour and defatted soy flakes. In one preferred embodiment, the aqueous slurry comprises $\frac{1}{2}\%$ to 30%, and most preferably 5% to 15%, by weight, of defatted soy flour. In another preferred embodiment, the aqueous slurry comprises 0.5% to 20%, most preferably 1% to 10%, by weight, of a soy protein isolate. As used herein and in the claims "aqueous slurry" is understood to mean a slurry comprising more than 50% water by weight. The fluid portion of the aqueous slurry may be selected from water, and aqueous saline or sulfated solutions. In a preferred embodiment using defatted soy flour or soy protein isolate the fluid is water.

The product, referred to as a protein isolate and/or dietary fiber, produced by the method which is disclosed herein has utility as an ingredient in a nutritional composition. A soy protein isolate produced by the above described process has utility as an ingredient in a nutritional product such as a non-dairy nutritional product for human infants.

The method employed for the determination of phytate in a vegetable flour, flakes, protein or dietary fiber is crucial to the accurate assessment of phytate reduction processes. No current published analytical method is sufficient to accomplish the desired quick, quantitative measurement of phytate in plant proteins and dietary fiber. Through the expenditure of a great deal of effort such a method has been developed. The procedure involves the extraction of phytate with hydrochloric or trichloroacetic acid, separation on a mixed-mode column using a sodium hydroxide gradient, and subsequent detection via suppressed conductivity. The terms "protein isolate having a low phytate content" and "dietary fiber having a low phytate content" as employed herein and in the claims are understood to mean a protein or dietary fiber product containing less than 1.0% by weight of phytate as determined by the analytical method set forth below which is hereinafter referred to as the "ion chromatographic procedure". The procedure comprises the following steps.

1. A sample of the material to be tested is weighed and extracted in 2.4% hydrochloric acid in a shaker bath for two hours. It is understood that sample weight is dependent upon the estimated concentration of phytate, i.e. the higher the estimated level of phytate the smaller the sample size should be.

2. The pH of the sample is adjusted to be greater than 8, followed by quantitative transfer and dilution to a specified volume. It is believed that persons of ordinary skill in the science of analytical chemistry will understand that the exact amount of dilution is dependent upon the estimated concentration of phytate in the sample.

3. The diluted sample is filtered through #2V Whatman filter paper and the filtrate is collected in a suitable container.

4. An aliquot of the filtrate is injected onto an OmniPac TM mixed mode column, available from Dionex Corporation, Sunnyvale, Calif., U.S.A. and separation is achieved utilizing a 200 mM sodium hydroxide gradient in the range of 28% to 75%, in the presence of 5% isopropyl alcohol at a flow rate of 1.0 ml per minute.

5. Detection of phytate in the sample is made via suppressed conductivity utilizing a Dionex anion micromembrane suppressor (AMMS). The micromembrane suppressor exchanges increasing sodium ions in the mobile phase with hydrogen cations from the regenerant (0.15% sulfuric acid), thereby suppressing the increasing background signal present due to the increasing sodium hydroxide concentration in the gradient. The detector then measures conductivity due to the structurally attached phosphate portion of the phytate structure.

6. The concentration of phytate in the sample is determined by comparison of chromatographic data of the sample with standards of known concentrations of phytate. For example, this analytical procedure has been successfully practiced using a Spectra Physics Model 4270 Integrator, but it is understood that any suitable equipment such as another integrating system or a chart recorder may be employed in this procedure.

It is believed that a person of ordinary skill in the science of analytical chemistry will find it obvious to adjust sample sizes, dilutions, and so forth of materials which are to be compared, (including known concentrations), in order that the results may be plotted in an easily comparable range of values.

EXPERIMENT NUMBER 1

Initial work on phytate removal using alumina was conducted with simple phytate-in-water and phytate-in-hydrochloric acid solutions. Basic, neutral, and acidic alumina columns, (which are available from Alltech Associates, 2051 Waukegan Road, Deerfield, Ill. 60015) were wet down with deionized water and placed on a Vac-Elut TM vacuum manifold to allow the water to pass through. The Vac-Elut TM is available from Analytichem International, (Varian Sample Preparation Products), European Technical Center Street, John's Innovative Center, Cowlegy Road, Cambridge CB4 4WS, England. Solutions were made which contained approximately 100 ppm phytic acid in water and in 0.2% hydrochloric acid, and then 7 ml of each phytic acid type were pulled through each column one or two times using a vacuum. Eluants through the column were collected, and aliquots of each were injected into the Dionex System for phytate analysis. Samples of phytate which had not been passed through the alumina columns were also injected as "reference" solutions with which to compare the treated samples. The results of these experiments are set forth in Table 1 which shows that all three of the alumina types reduced the phytate level in 100 ppm phytate starting solutions. However, the most effective phytate reduction was seen using acidified phytate solutions or using the acidic alumina column with phytate in water. This indicated the necessity of acidic conditions, either with the alumina itself or with the phytate-containing solution. Results of this experiment supported the theory that alumina has utility for separating phytate from plant protein.

TABLE 1

|  | Through Column Once Phytate Reduction | | Through Column Twice Phytate Reduction | |
| --- | --- | --- | --- | --- |
|  | Phytate In HCl | Phytate In H$_2$O | Phytate In HCl | Phytate In H$_2$O |
| Acidic Alumina | 99.2% | 96.3% | 100% | 97.7% |
| Basic Alumina | 97.1% | 12.3% | 99.3% | 21.7% |
| Neutral Alumina | 98.1% | 49.4% | 100% | 71.6% |

PP1610 soy protein isolate was selected as the protein for further experimentation because of the widespread commercial use of this protein isolate in nutritional products for infants. PP1610 is a commercially available soy protein isolate product manufactured by Protein Technology International which is a division of Ralston Purina, 835 South 8th Street, St. Louis, Mo. 63012. (Protein Technologies International has indicated that some time in 1991 the "trade name" of PP1610 will be changed to "SUPRO 1610"). It is believed that PP1610 is typical of commercially available soy protein isolates which are made by adjusting the pH of a soy flour slurry to about 9 in order to solubilize the protein; then centrifuging the slurry to separate a sludge of fiber and insoluble materials from a centrate containing the soluble protein; then adjusting the pH of the centrate to 4.5 to precipitate the protein; and then again centrifuging to get a sludge containing the protein. It is believed that PP1610 has had the pH adjusted to 7.0 to neutralize it.

EXPERIMENT NUMBER 2

Attempts were made to pass slurries having a variety of concentrations of the soy protein through the Alltech alumina columns. The concentrations of soy protein in water which were used were: 0.75%, 1.25%, 2.5%, and 5% by weight. All percentages for slurries and solutions set forth herein and in the claims are by weight. Initial experiments with the soy protein slurry and alumina columns were disappointing. None of the slurries would pass through the columns because the alumina particles were too small and too densely packed. Additionally, the protein slurries were too viscous and contained too much insoluble material to effectively pass through the column. This problem could have been alleviated if alumina with a larger particle size had been available. Therefore a change was made in the experimental procedure and the alumina was added directly to the protein slurry in a batch process. Alumina was removed from the Alltech columns and similar amounts of the alumina were added directly to the protein slurries, mixed well, and then samples were removed for phytate analysis. The results of this experiment are shown in Table 2 and indicate that good phytate reduction in the soy protein was achieved using this batch treatment" procedure. However, the results of this experiment indicated that perhaps one of the limiting factors was the amount of alumina added. In this experiment each sample was treated with substantially the same amount of alumina. The treated samples were compared with untreated samples of each slurry to determine the amount of phytate reduction. Although the relative amounts of phytate removed were similar in all slurry concentrations, the percentages removed were greater for weaker slurries since there was less protein, and thus less phytate, present initially.

TABLE 2

| pH of Slurry | Protein in Slurry by weight | % Phytate Reduction |
| --- | --- | --- |
| 2.0 | 5% | 0% |
| 4.0 | 5% | 0% |
| 6.0 | 5% | 65.2% |
| 8.0 | 5% | 50.3% |
| 9.0 | 5% | 6.01% |
| 9.0 | 2.5% | 9.13% |
| 9.0 | 1.25% | 20.4% |
| 9.0 | 0.75% | 35.9% |
| 10.0 | 5% | 52.3% |

It was observed throughout these early experiments that an unusually high amount of drift and relatively quick loss of sensitivity was seen in the ion chromatographic procedure after some of the alumina-treated samples had been injected. It was observed also that this phenomenon could be reversed by changing the 0.15% sulfuric acid regenerant, and periodically changing the AutoRegen anion cartridge on the regeneration module of the Dionex system. This effect may have been caused by the high aluminum content of the soy protein. No standard curve run was attempted, and "control" samples were run frequently to obtain a true idea of phytate content of experimental samples. Samples are therefore compared only to a "control" to determine phytate reduction, and results are not on a true "concentration" basis. This comparison was used throughout these experiments, giving an approximate "% reduction" in phytate levels.

Table 3 shows a comparison of the data produced by a computer-generated experimental design. General trends in this data show that lower pH tends to be more effective in phytate removal. Temperature, particle size, pH, aluminum:phytate ratio and protein slurry concentration were evaluated as variables. Time was not evaluated as a variable, as it was not believed that time significantly affected the phytate attachment to the alumina. Particle size had some effect, although this may have been partially due to alumina type (acid, basic, neutral). Temperature does not appear to affect phytate removal, but may have an effect on the aluminum content of the treated protein. The protein slurry concentration and aluminum:phytate ratio are significant only to the relative amounts of phytate present in each protein slurry.

TABLE 3

| | FACTORS | | | | RESULTS | |
| --- | --- | --- | --- | --- | --- | --- |
| RUN | TEMP (°C.) | SURFACE AREA ($m_2g$) | pH | RATIO OF ALUMINUM TO PHYTATE | SLURRY CONCENTRATION (% by weight) | PHYTATE CONCENTRATION (% by weight) |
| 1 | 35 | 350 | 7 | 72 | 5 | 2.07% |
| 2 | 35 | 350 | 6 | 18 | 2.5 | 2.34% |
| 3 | 35 | 350 | 3 | 72 | 3 | 0.20% |
| 4 | 35 | 300 | 7 | 39 | 1 | 2.21% |
| 5 | 35 | 350 | 3 | 6 | 5 | N/D |
| 6 | 35 | 250 | 4 | 39 | 3 | 1.38% |
| 7 | 35 | 250 | 7 | 6 | 5 | 2.40% |
| 8 | 35 | 350 | 5 | 39 | 1 | 0.23% |
| 9 | 35 | 250 | 3 | 39 | 5 | — |
| 10 | 35 | 350 | 7 | 6 | 5 | 2.04% |
| 11 | 35 | 250 | 7 | 6 | 1 | 2.68% |
| 12 | 35 | 250 | 7 | 72 | 3 | 1.63% |
| 13 | 35 | 250 | 3 | 6 | 1 | 0.16% |
| 14 | 50 | 300 | 7 | 24 | 3 | 1.64% |
| 15 | 50 | 250 | 3 | 39 | 1 | 0.05% |
| 16 | 50 | 250 | 5 | 6 | 5 | 0.90% |
| 17 | 50 | 300 | 5 | 72 | 5 | 0.50% |
| 18 | 50 | 350 | 3 | 6 | 1 | N/D |
| 19 | 65 | 300 | 3 | 72 | 3 | 0.36% |
| 20 | 65 | 350 | 7 | 72 | 3 | 2.00% |
| 21 | 65 | 350 | 4 | 39 | 3 | N/D |
| 22 | 65 | 250 | 3 | 72 | 5 | 0.88% |
| 23 | 65 | 250 | 7 | 72 | 5 | 1.91% |
| 24 | 65 | 300 | 7 | 39 | 5 | — |
| 25 | 65 | 350 | 7 | 6 | 5 | 1.78% |
| 26 | 65 | 250 | 6 | 18 | 2.5 | 2.14% |
| 27 | 65 | 350 | 7 | 6 | 1 | 2.60% |
| 28 | 65 | 300 | 3 | 6 | 1 | 0.07% |
| 29 | 65 | 250 | 5 | 39 | 1 | 1.95% |
| 30 | 65 | 250 | 7 | 1 | 1 | 2.53% |
| 31 | 65 | 350 | 3 | 39 | 5 | 0.09% |
| 32 | 65 | 250 | 3 | 6 | 5 | 0.25% |

EXPERIMENT NUMBER 3

Figure 2:
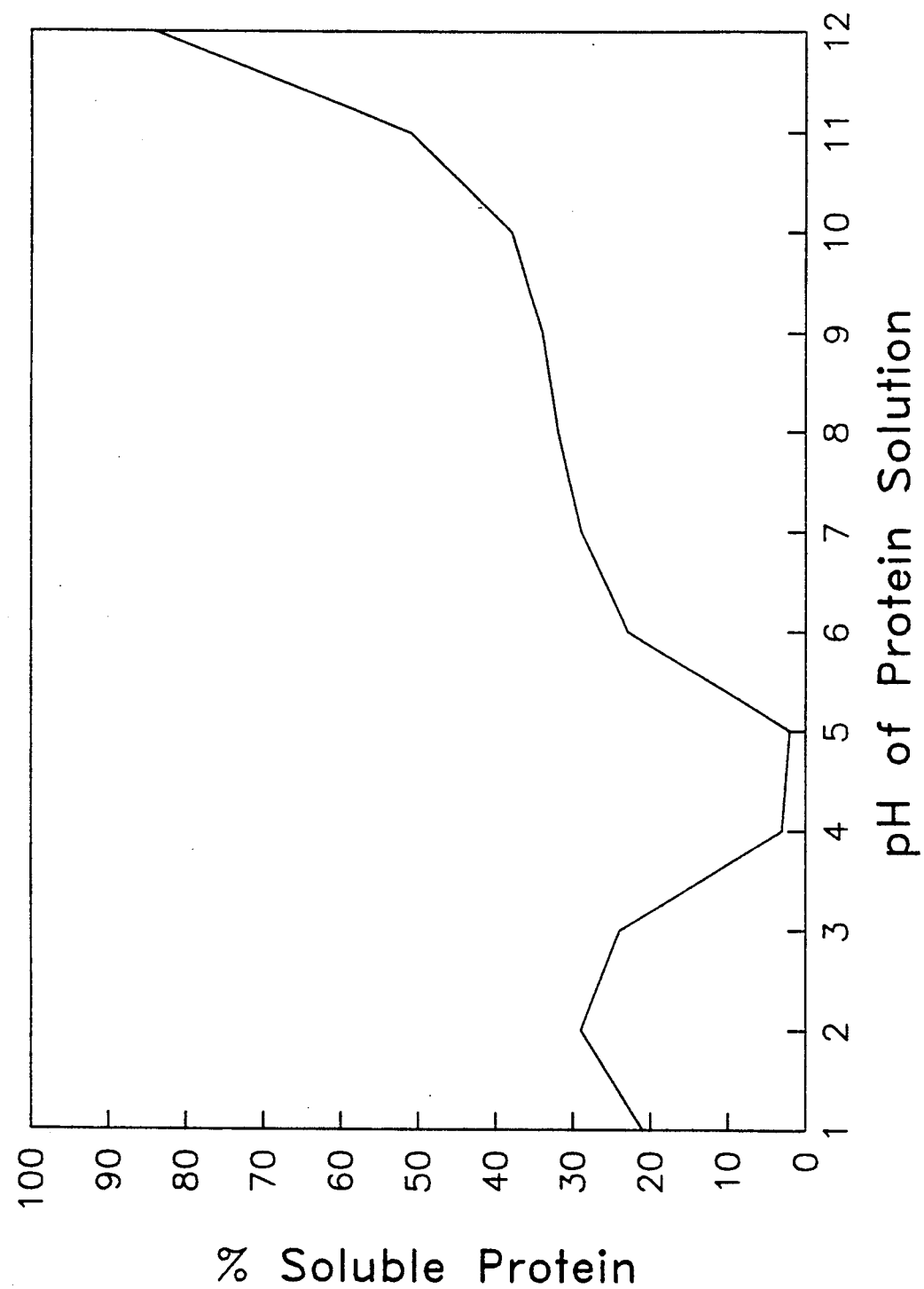
FIG. 2 is a graph showing the effect of pH on the solubility of a soy protein isolate.
Figure 3:
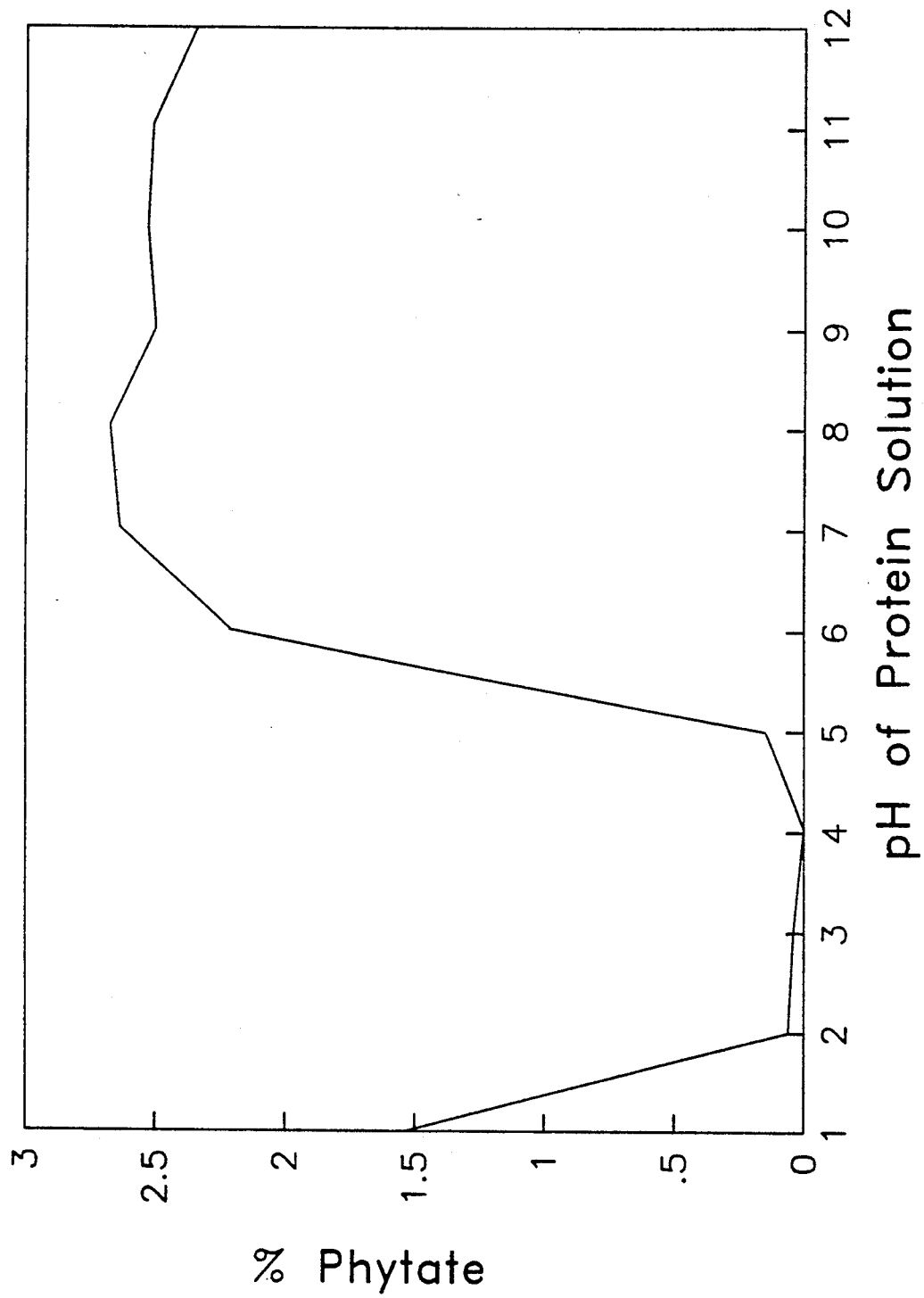
FIG. 3 is a graph showing the effect of pH on the phytate content of a soy protein isolate.

The solubility of PP1610 soy protein at varying pHs was investigated. An experiment designed to determine the solubility of the PP1610 soy protein over a pH range from 1 to 12 proved to be invaluable. 1% slurries of soy protein were placed into beakers and adjusted to a pH between 1 and 12 with either hydrochloric acid or sodium hydroxide. Each slurry was then centrifuged, and the supernatant was decanted and tested for protein and phytate. Protein was determined using the Kjeldahl protein and analysis method. The Kjeldahl nitrogen/protein method is based on AOAC Method 955.04, "Improved Kjeldahl Method for NitrateFree Samples". This method appears on p. 18 of the 15th edition of the AOAC official methods book. For the phytate determination, 40 g of 1% protein solution were weighed into a 125 ml Erlenmeyer flask, and 4 ml of 25% hydrochloric acid were added. The sample was extracted for two hours, and adjusted to a pH >8.5. Samples were then transferred to a 100 ml volumetric flask and brought to volume with water. Prior to injection into the chromatograph, samples were filtered through #2 V Whatman filter paper. FIG. 2 is a solubility curve representing the protein concentration data collected during this experiment. FIG. 2 shows that the protein is slightly soluble from pH 1–3, very insoluble from pH 4–5, and exhibits increasing solubility with increasing pH above 5. Clearly, the protein is never completely soluble; even at pH 12, approximately 15% of the protein remains insoluble. FIG. 3 is a graph which illustrates the variation of the phytate concentration over this pH range. The phytate remains attached to protein over the extent of the curve.

EXPERIMENT NUMBER 4

Figure 4:
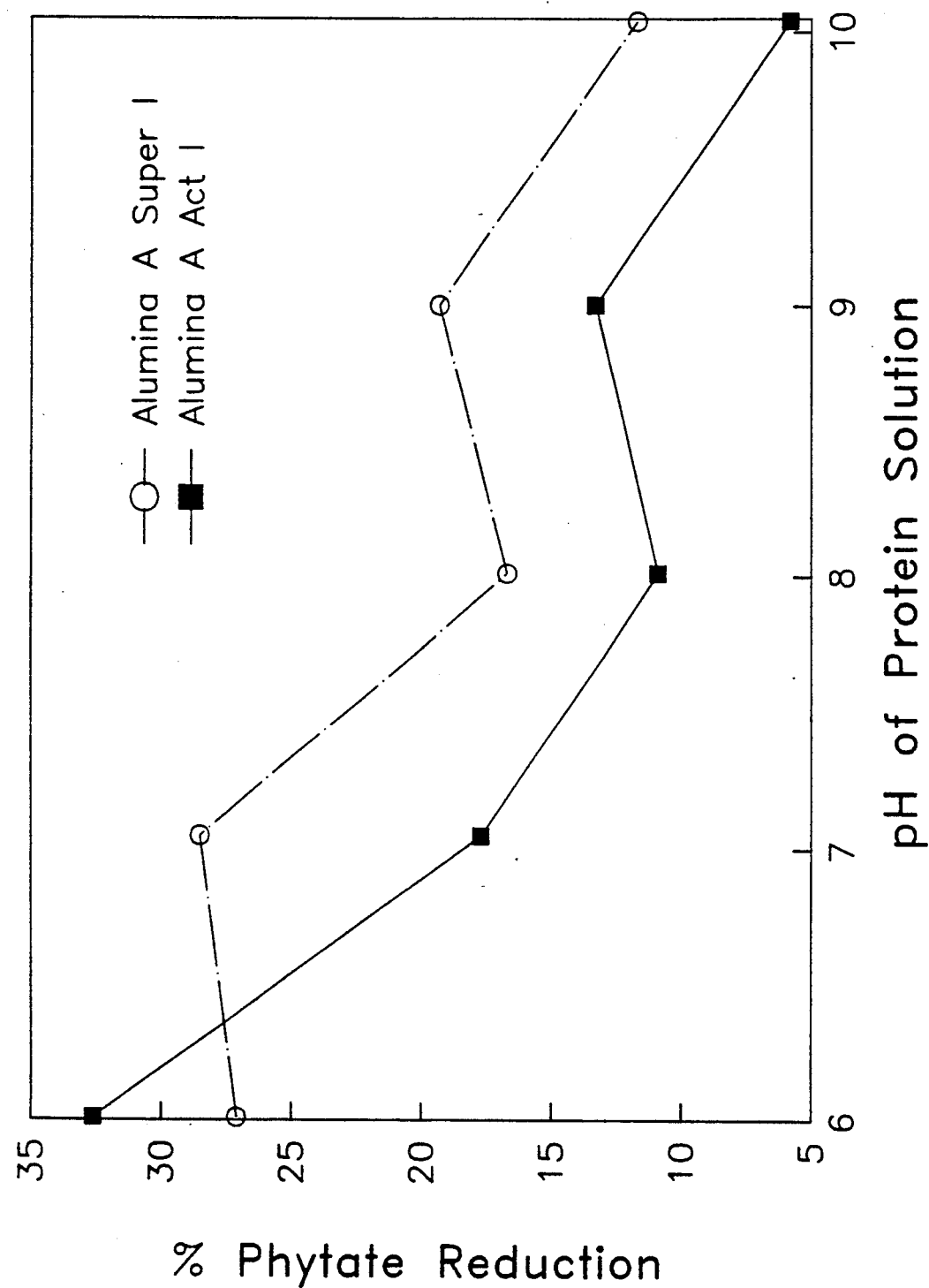
FIG. 4 is a graph showing the effect of pH on an acid alumina treatment of a soy protein isolate.

It appeared that acid alumina, which had been treated with hydrochloric acid, would have the greatest capability to remove phytate, therefore in this experiment acid alumina was added to 1% slurries of PP1610 at pH values of 6, 7, 8, 9, and 10. Samples of each of the slurries were treated with two grades of acid alumina (Alumina A Super 1 and Alumina A Act 1 from Universal Scientific). Phytate levels were determined for these samples. The evaluation of the effect of pH on acid alumina over a pH range of 6–10 is presented in FIG. 4 which shows that with an increase in pH of the protein solution, there was a decrease in the ability of the alumina to reduce phytate concentrations. Even at the low end of the pH range of the experiment (pH 6), phytate removal was only 30–35%, and this reduction was due to protein loss because of decreased protein solubility at lower pH.

Following a comparison of the results of protein solubility (FIG. 2) and phytate:alumina binding conditions (FIG. 4), it was concluded that a two-step pH process would be beneficial for both the removal of phytate and the recovery of protein. The theory behind a two-step pH alumina treatment for phytate removal from the protein is that the phytate:protein complex attached to the alumina at a low pH; (Phytate would probably be present as phytic acid at this low pH). When the pH was raised, the protein portion of the phytate:protein complex would solubilize, but the phytate would remain attached to the alumina.

EXPERIMENT NUMBER 5

Figure 5:
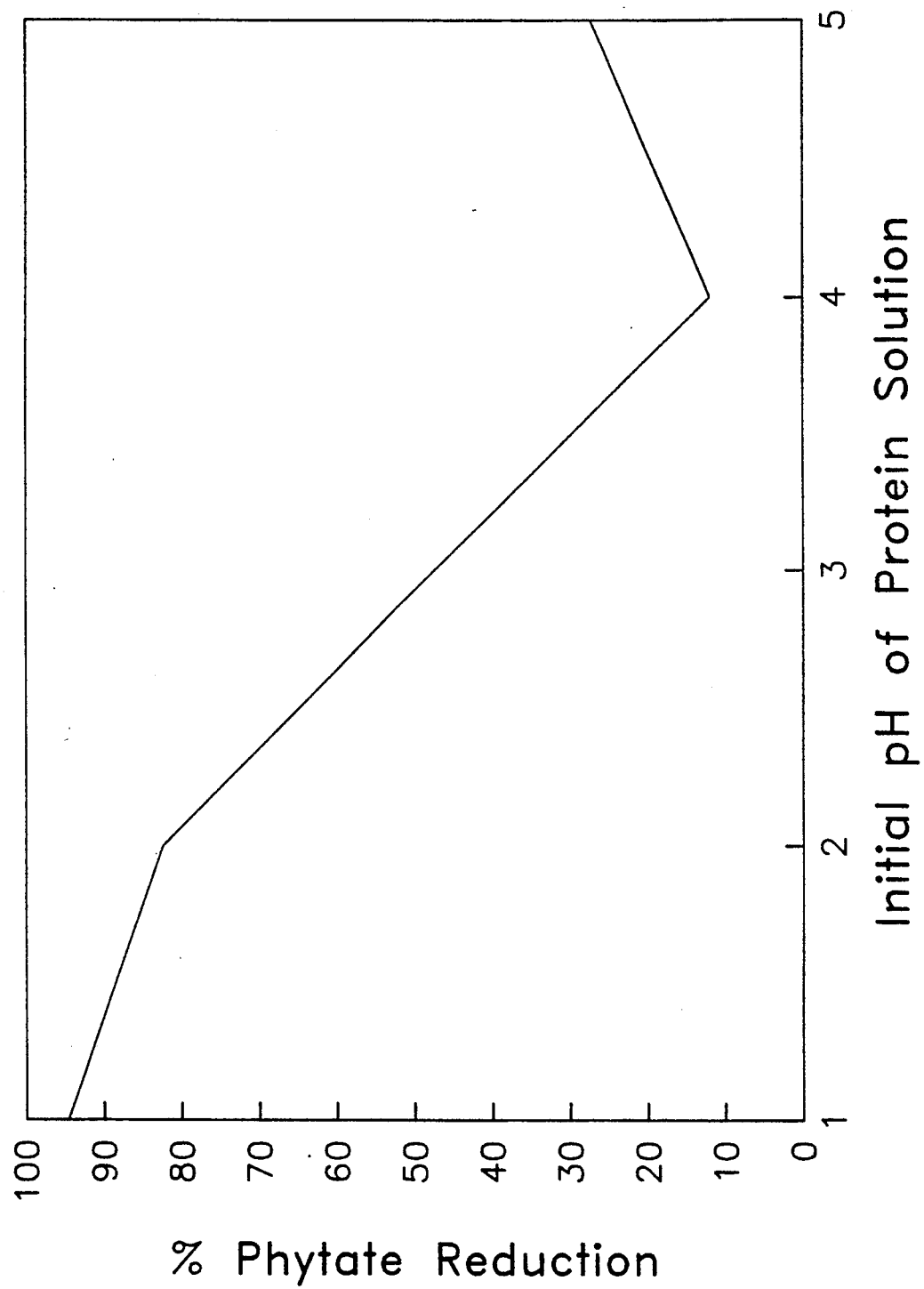
FIGS. 5, 6, 7, and 8 are graphs showing the effect of a two step pH alumina treatment on phytate reduction for a soy protein isolate.

The two step alumina treatment theory was tested with the protein solution treated with alumina at initial pH levels of 1–5, then raised to a pH of 8. Portions of 1% slurries of PP1610 soy protein were adjusted to initial pH values of 1.0, 2.0, 3.0, 4.0, and 5.0. A portion of the protein slurry at each pH was set aside for phytate testing. To the remaining slurry was added Alumina A Super I (Universal Scientific) at an aluminum:phytate molar ratio of approximately 30:1. After allowing the alumina to react with the protein slurry, each protein solution was adjusted to a pH of 8.0 with sodium hydroxide. Samples were then prepared for phytate and protein analyses. FIG. 5 shows the phytate reductions achieved in this experiment. Phytate was significantly reduced during this experiment, especially towards the lower end of the pH range. Protein loss at the secondary pH of 8, although less than in previous experiments, was still significant (24%–46%). This was to be expected, however, from the protein solubility curve (FIG. 2). Extrapolation using the protein solubility curve, suggested that a pH of 12 would offer the best solubility conditions; however, above pH 10, lysinoalanine is formed in the protein, and this would be a most undesirable impurity as it is believed to be nutritionally detrimental. It was concluded from this experiment that the lower the initial pH the more effective the phytate removal.

EXPERIMENT NUMBER 6

Figure 6:
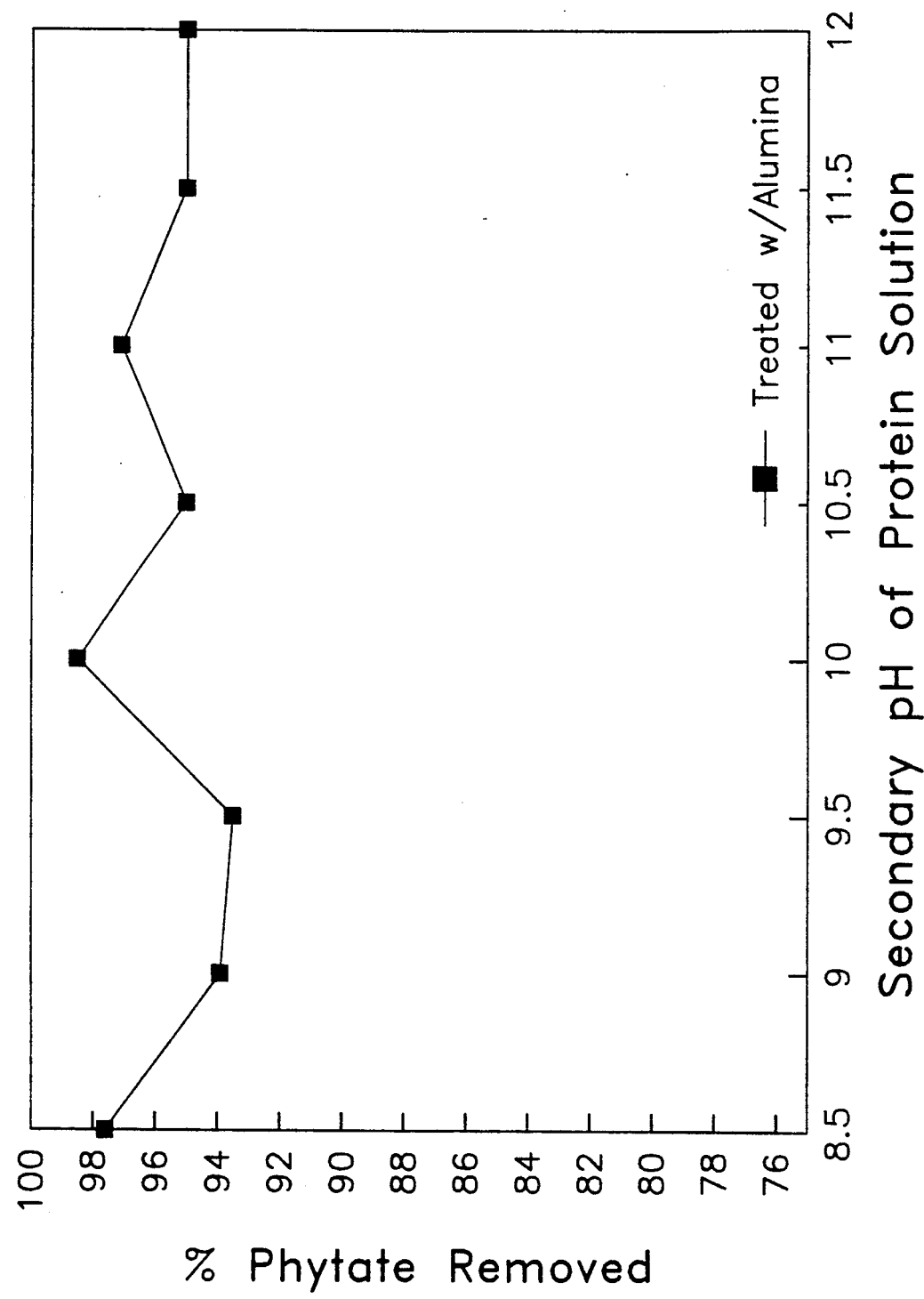
Figure 7:
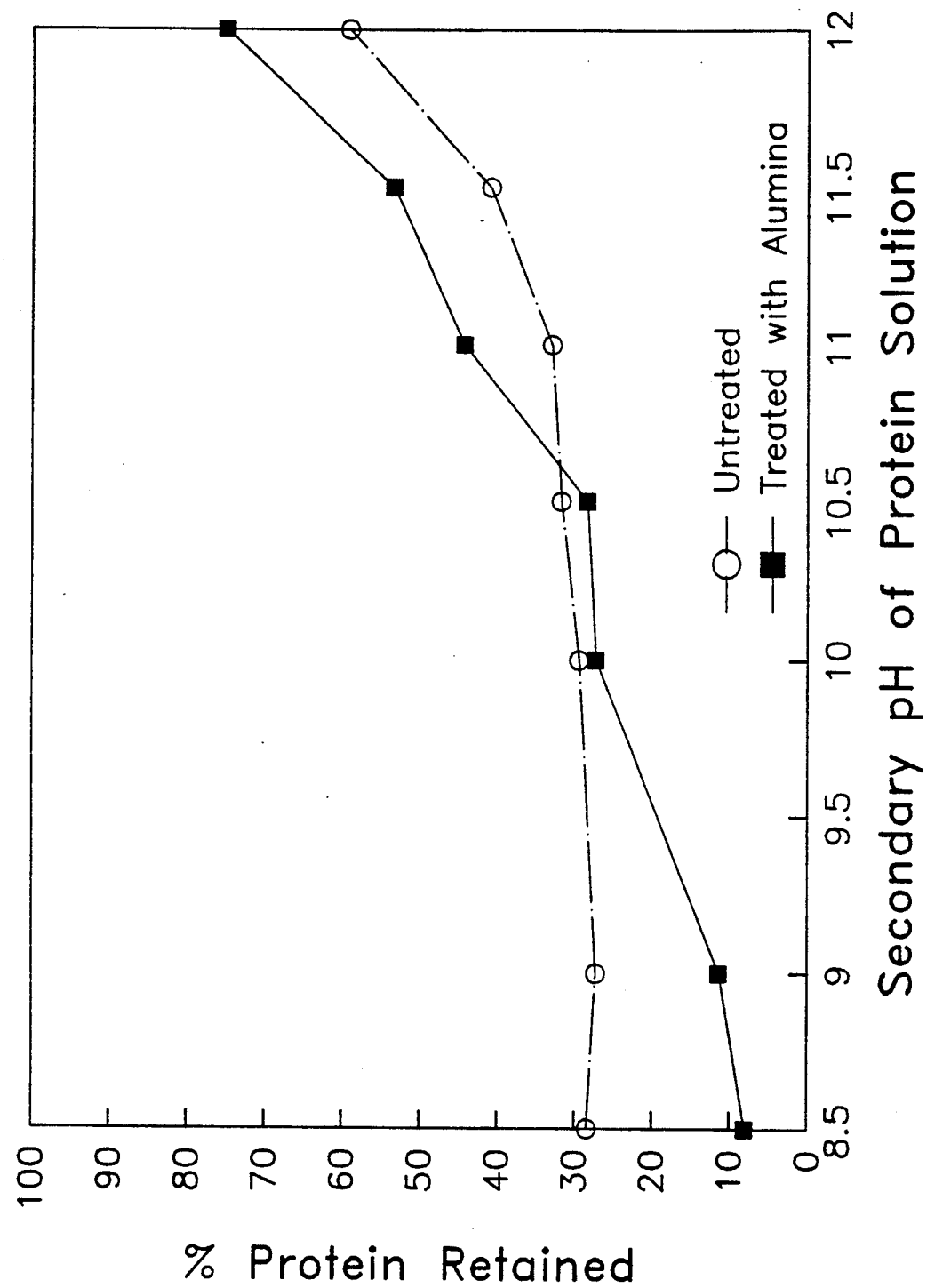
Figure 8:
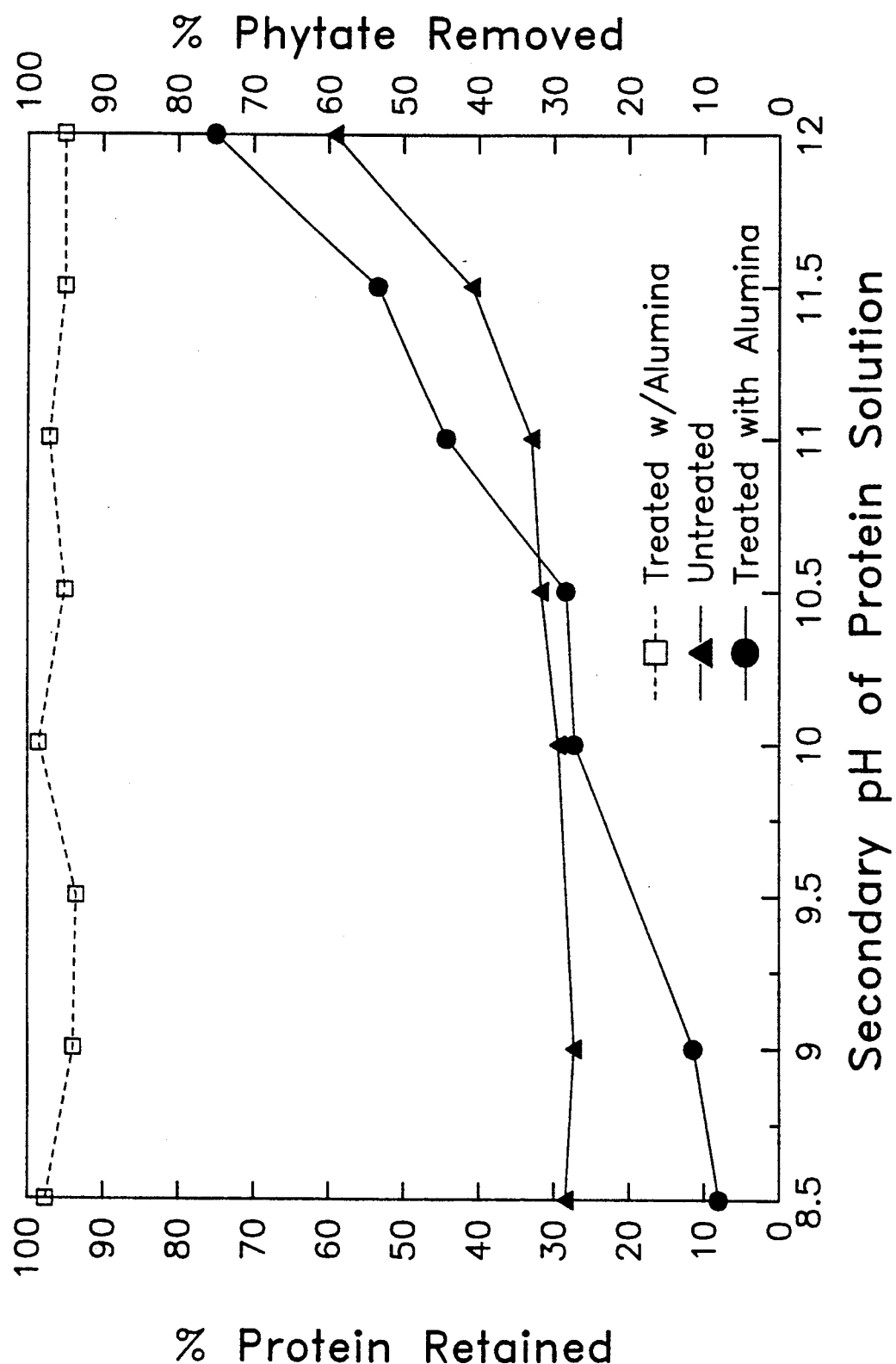

The next experiment involving pH treatment of the protein with alumina at an initial pH of 1, then raising the secondary pH to 8.5–12.0 (two-step pH treatment) gave some very interesting results. With the successful removal of phytate and a good recovery of protein using the two-step pH process, a study of the protein redissolution step became necessary. 1% PP1610 soy protein was slurried, adjusted to a pH of 1.0 with hydrochloric acid, and split into two portions. One portion was treated by adding Alumina A Super I portion (aluminum:phytate molar ratio approximately 30:1) and was allowed to mix well. Both the treated and untreated portions of the protein slurries were adjusted to pH secondary values of 8.5, 9.0, 9.5, 10.0, 10.5, 11.0, 11.5, and 12.0. Both the treated and untreated protein slurries were tested for phytate and protein content. FIG. 6 shows the effect of the alumina on phytate concentration across this range of secondary pH's. Clearly, the treatment is equally effective in phytate reduction from secondary pH's between 8.5 and 12. FIG. 7 shows the effect of alumina on the protein concentration across this pH range of secondary pH's, and compares the soluble protein in the treated and untreated slurries. The alumina does not obstruct protein recovery and, in fact, seems to improve protein solubility slightly above pH 10.5. FIG. 8 combines FIGS. 6 and 7, showing effective phytate removal across the range of pH's at which soy protein is soluble for efficiently practicing the invention. The experimental condition of choice, was, therefore, a secondary pH range between 9.2 and 9.6 to maximize protein solubility and minimize lysinoalanine formation.

EXPERIMENT NUMBER 7

Several different types of alumina from various vendors were evaluated for effectiveness in protein recovery and phytate removal. The vendors were Alcan Chemicals (Alcan) Division of Alcan Aluminum Ltd., 4000 Development Dr. Box 250, Brookville, Ontario, Canada BA Chemicals Ltd., (BA Chemicals) Division of British Alcan Aluminum, Chalfont Park, Gerrardo Cross, Buckinghamshire, SL9 OQB Great Britain, and Universal Scientific Incorporated (Universal Scientific) of 2801 Bankers Industrial Drive, Atlanta, Ga. 30360. Zirconium was also tested because the adsorption of organic phosphates by zirconium dioxide (zirconium)

and titanium dioxide (titania) has been discussed in the prior art. ("New Ceramic Titania: Selective Adsorbent for Organic Phosphates", Hisashi et al., *ANALYTICAL SCIENCES*, Vol. 61 December 1990, pages 911–912). However, a source of titanium dioxide was not located and that material was not evaluated. Zirconium oxide which was approximately 93% pure was obtained from Zircoa, Inc. of 31501 Solon Road, Solon, Ohio 45139. To evaluate their effectiveness in phytate removal similar quantities of AA100 (Alcan), AA101 (Alcan), Desisphere (Universal Scientific), AL2100 Scavenger (Universal Scientific), BACO AF220 (BA Chemicals), Alumina B Act I (Universal Scientific), Alumina Act II-III (Universal Scientific), and zirconium dioxide (AGRAIN) were added to individual 1% slurries of PP1610 soy protein. The percentage of proten recovered in comparison to an untreated control sample was determined by the Kjeldahl protein method. Table 4 shows that several different types of alumina from different vendors were found to be as effective as the Alumina A Super I (Universal Scientific) used previously, and protein recoveries were comparable for many. Clearly the source of alumina is not a point of major concern. Zirconia, by contrast, showed no major useful properties for phytate removal.

TABLE 5

| | PP1610 | Alumina SPI CAN-1 | Alumina SPI CAN-2 | Alumina API CAN-3 | Alumina SPI CAN 4 | Fibrim 300 | Alumina Fiber | CNP Rice Protein | Alumina CNP |
|---|---|---|---|---|---|---|---|---|---|
| Calcium | 157 | 27.2 | 57.6 | 7.80 | 19.0 | — | — | — | — |
| Sodium | 1033 | 2460 | 83.5 | 2.63 | 8.60 | — | — | — | — |
| Potassium | 83.4 | 966 | 4224 | 1540 | 1584 | — | — | — | — |
| Magnesium | 32.6 | 60.8 | 60.3 | 8.96 | 8.44 | — | — | — | — |
| Phosphorus | 913 | 371 | 568 | 291 | 272 | — | — | — | — |
| Iron | — | — | — | — | 3.26 | — | — | — | — |
| Zinc | — | — | — | — | 1.18 | — | — | — | — |
| Copper | — | — | — | — | 1.77 | — | — | — | — |
| Manganese | — | — | — | — | 0.135 | — | — | — | — |
| Phytate | 2.05% | <0.2% | <0.5% | <0.5% | <0.1% | 1.06% | 0.17% | 0.02% | 0.02% |
| Yield | — | 35.1% | 22% | 32.3% | — | — | — | — | — |
| Protein | — | 76.4% | 76.5% | 87.0% | 84.46% | — | — | 54% | 73% |
| Ash | — | — | 11.7% | 3.62% | 4.50% | — | — | — | — |
| Moisture | — | — | 3.8% | 5.12% | 6.37% | — | — | — | — |
| Ca:P Ratio | 0.172 | 0.073 | 0.101 | 0.026 | 0.070 | — | — | — | — |

TABLE 4

| Alumina Type | % Phytate Reduction | % Protein Recovery |
|---|---|---|
| Alcan AA100 | 100% | 88.2% |
| Alcan AA101 | 100% | 76.4% |
| Universal Scientific Desisphere | 42.9% | 105% |
| Universal Scientific AL2100 | 67.2% | 103% |
| BACO AF220 | 24.5% | 106% |
| Universal Scientific Alumina B ActI | 100% | 91.8% |
| Universal Scientific Alumina N SuperI | 100% | 95.5% |
| Universal Scientific Alumina ActII-III | 100% | 91.5% |
| Zirconium Dioxide AGRAIN | 0% | 97.9% |

A disadvantage of treating commercially available soy protein isolates with alumina lies with protein resolubilization and the inability of any process to fully recover all of the protein in a soluble form. The batch treatment process used thus far consisted of the addition of alumina directly to the protein slurry, and then centrifugation to remove the alumina, with any insoluble protein being discarded with the alumina. This situation would not be true if a column-treatment apparatus was used. Column technology would require alumina particles considerably larger than the insoluble protein particles and the pores of the mesh bed support, thus allowing passage of the protein slurry. In either the column or the batch treatment processes, however, it would seem practical to treat the protein during its isolation from the soy flour/flakes.

The conventional Process of soy protein isolate manufacture consists of adjusting the pH of a 10% soy flour slurry in water to 9.2–9.6, holding the pH for a period of approximately 45 minutes to dissolve the protein portion of the soy flour, and then centrifuging, at which time the fiber portion of the soy flour falls to the bottom. The liquid portion, containing the dissolved protein, is then removed and adjusted to a pH of approximately 4.5, the isoelectric point of the soy protein. The protein precipitate is centrifuged, resuspended in water to wash, and recentrifuged. The wet protein can then be spray dried, freeze dried or used as a wet curd.

Table 5 shows the results from experiments 8, 15 and 16 which are described below.

EXPERIMENT NUMBER 8

This experiment was designed to couple the conventional method of isolating soy protein from soy flour with the alumina batch treatment process. The conventional process of protein manufacture from soy flour was adapted to include an alumina treatment in accordance with the present invention both on a bench scale and in a pilot plant. A 10% slurry of soy flour in water was adjusted to an initial pH of 1.0 with hydrochloric acid. The use of hydrochloric acid to lower the pH of the 10% soy flour slurry, would raise the chloride level of the resulting soy protein isolate. A final water rinse would reduce this chloride level. A portion of the soy flour slurry was removed for phytate testing "before alumina treatment". Alumina A Super I (Universal Scientific) was added to the remaining slurry and mixed well for approximately 8 minutes. The pH of the slurry was then adjusted to a secondary pH of 9.2–9.6 with sodium hydroxide, and this secondary pH was maintained (with the addition of sodium hydroxide) for 45 minutes. The use of potassium hydroxide in combination with sodium hydroxide is a way to control both the sodium and potassium content of the final soy protein; these could be reduced somewhat using a final water rinse. The slurry was then centrifuged at about 1700 rpm for 15 minutes. The supernatant was decanted and adjusted to a pH of 4.5 with hydrochloric acid. The protein precipitate, labeled "CAN-1", was then freeze dried, weighed, and the total yield was calculated. This protein fraction was submitted for analytical characterization, the results of which are presented in Table 5.

This experiment was then repeated on a larger scale in a pilot plant environment. A 10% slurry containing approximately 20 pounds of soy flour was used to manufacture the soy isolate. Alcan Activated Alumina AA101 was used because of limited availability in-house of Alumina A Super I. Potassium hydroxide was used instead of sodium hydroxide for the pH adjustments because of the desirability of a low sodium content for the protein. All other aspects of the experiment remained identical to the previous bench scale experiment. This sample was labeled "CAN-2", and was submitted for relevant analyses, the results of which are presented in Table 5.

Table 5 comprises analytical data from CAN-1, the batch of soy protein made in the laboratory, and CAN-2, the soy protein manufactured on a larger scale in the pilot plant. Protein recovery in the CAN-2 batch was lower than the CAN-1 bench scale batch, largely because non-optimal alumina (Alcan AA101) had been used for the process. This lower protein recovery was consistent with previous findings from experiments using this alumina (Table 4). Also, since these protein isolates were not washed with water, mineral and ash levels were higher than might have otherwise been expected with commercial grade isolates.

TABLE 6

| | Amino Acid Profile Comparison (g/100 g protein) | | |
| --- | --- | --- | --- |
| | Commercial Soy Proteins | | Alumina Soy |
| Amino Acid | PP1610 | PP750 | Protein CAN-4 |
| Aspartic Acid | 11.463 | 12.493 | 11.660 |
| *Threonine | 3.712 | 4.266 | 3.821 |
| Serine | 5.312 | 5.710 | 5.469 |
| Glutamic Acid | 18.953 | 21.315 | 19.275 |
| Proline | 5.156 | 5.704 | 5.367 |
| Glycine | 4.037 | 4.445 | 4.215 |
| Alanine | 4.134 | 4.563 | 4.125 |
| *Valine | 4.027 | 4.566 | 4.374 |
| *Methionine | 1.156 | 1.461 | 1.249 |
| *Isoleucine | 4.029 | 4.733 | 4.368 |
| *Leucine | 7.715 | 8.534 | 7.972 |
| Tyrosine | 3.900 | 4.118 | 4.008 |
| *Phenylalanine | 5.054 | 5.500 | 5.253 |
| Histidine | 2.460 | 2.716 | 2.566 |
| *Lysine | 6.033 | 6.454 | 5.900 |
| Arginine | 7.439 | 8.075 | 7.350 |
| *Tryptophan | 1.196 | 1.640 | 1.421 |
| Cystine | 1.291 | 1.280 | 1.423 |

*Essential amino acids

EXPERIMENT NUMBER 9

The object of this experiment was to determine the best aluminum-to-phytate molar ratio for effective phytate removal. Molar ratios from 3.5:1 to 550:1 aluminum:phytate were evaluated. Phytate determinations were then made on these samples. Table 7 shows an approximate conversion of molar ratios to weight-to-weight ratios.

Figure 9:
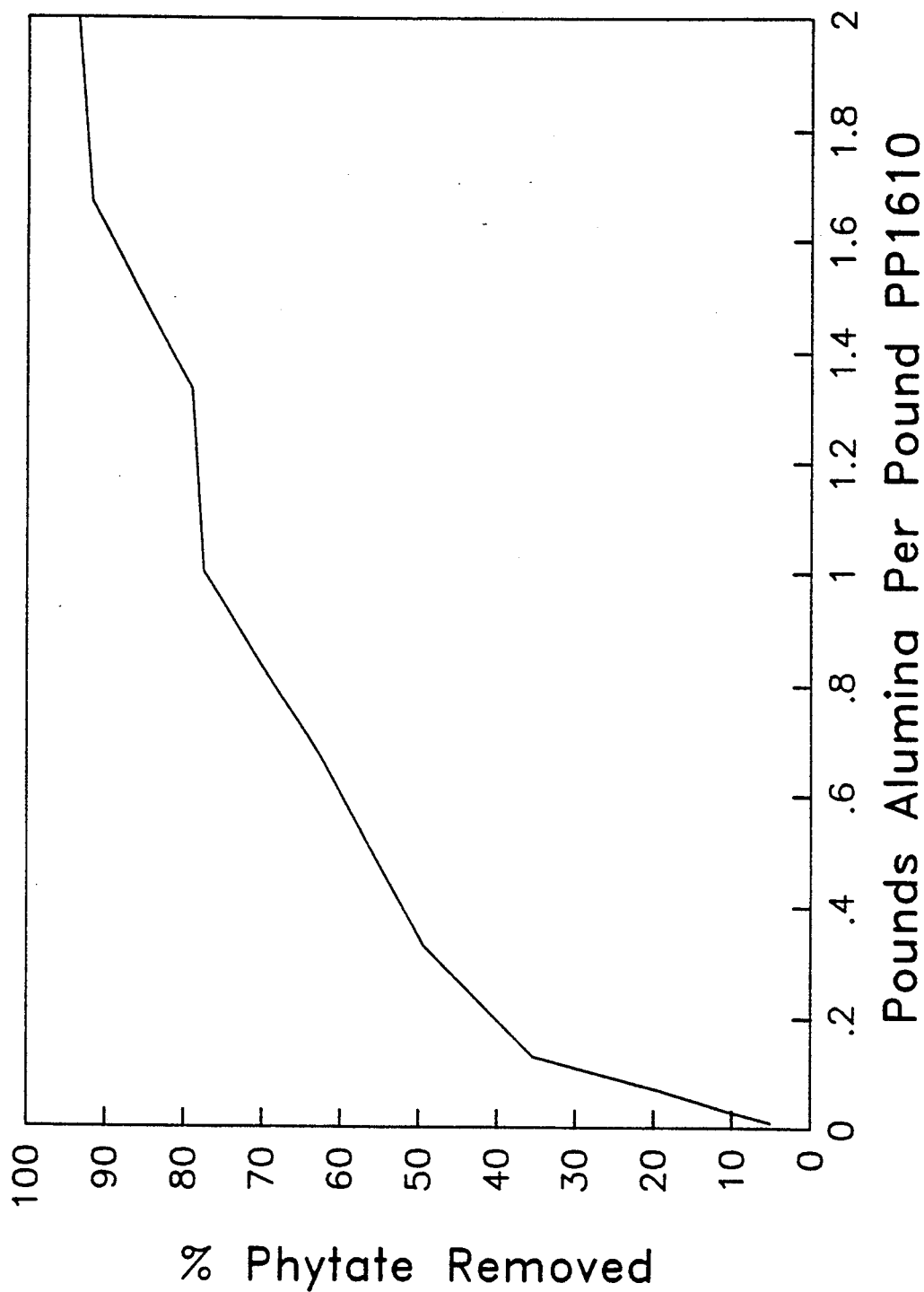
FIG. 9 is a graph showing the effect of the alumina:-protein ratio on phytate removal for a soy protein isolate.

In an industrial application the cost for this alumina treatment would be a primary concern, thus the accurate determination of alumina requirements per pound of protein for effective phytate reduction is important. The determination of these required ratios, alumina-to-protein (phytate), was made and is shown in FIG. 9. It is clear from FIG. 9 that a "sliding scale" of phytate removal could be achieved if desired. The experiment showed also that about 1.7 pounds of alumina would be required to remove 90% or more of the phytate from pound of the commercially available soy protein isolate. Discarding the alumina after a single use would be very costly, rendering the process unattractive from a cost standpoint. The regeneration process for the alumina which is disclosed below greatly improves cost effectiveness.

EXPERIMENT NUMBER 10

The results of the molar ratio alumina:phytate study, dictated that an alumina regeneration process would be necessary if the method disclosed herein is to be cost-effective. For this reason, the Alumina A Activity I (Universal Scientific) was used to treat a quantity of PP1610. The "spent" alumina was then divided and samples were treated with one of the following: 1% sodium hydroxide, 10% sodium hydroxide, 1% sulfuric acid, 10% sulfuric acid, 20% sulfuric acid, 15% acetic acid, 5%. hydrochloric acid, 10% hydrochloric acid, 20% hydrochloric acid, and a combination 2% sodium hydroxide/10%. sulfuric acid. The treated alumina samples, as well as a "spent" alumina sample (no regeneration attempted) as a "control", were investigated using X-ray fluorescence spectroscopy to assess phosphorus attachment to the alumina. "Spent" alumina, which had been used to remove phytate from PP1610 soy protein isolate was qualitatively compared with "conditioned" alumina sample of which had been variously treated. A comparison of the spent alumina with that which had been treated with hydrochloric acid showed only a minimal amount of the phosphorus had been removed from the alumina. Alumina which had been treated with acetic acid showed evidence of gel formation. Sodium hydroxide and sulfuric acid rinses seemed to show the most promise for removal of the phosphorus attached to the alumina, with increasing concentrations of sulfuric acid and sodium hydroxide having increasing removal effects. A combination of sodium hydroxide and sulfuric acid seemed to be the most effective in stripping the phytate/phosphorus from the alumina.

EXPERIMENT NUMBER 11

The next experiment was conducted to determine the necessity of adjusting the initial pH of the protein/flour slurry to 1.0 for alumina treatment. The alumina was soaked in pH 1.0 hydrochloric acid for about 10 minutes, rinsed, and then added to a 1% PP1610 slurry which had not been pH adjusted in any way. The slurry was mixed well for about ten minutes, the secondary pH was adjusted to 9.2-9.4 with potassium hydroxide, and the slurry was centrifuged at about 2700 RPM for five minutes. Phytate content was then determined in the supernatant. The alumina, which had been soaked in hydrochloric acid solution and added directly to a PP1610 protein slurry was,, not effective in phytate removal. Although the acid alumina did reduce the pH of the slurry from 6.7 to 4.6, the pH was not low enough to facilitate effective alumina:phytate attachment.

EXPERIMENT NUMBER 12

The effects of initial pH on the alumina-phytate reaction was the emphasis of the next experiment. The alumina was added to the 1% PP1610 slurry at initial pH values of 1.0, 1.5, 2.0, 3.0, 5.0, and "as is", and was allowed to mix well. The solutions were adjusted to secondary pH's of 9.2–9.4, mixed for forty five minutes, and then the slurries were centrifuged in graduated centrifuge tubes. Phytate content of the slurries was determined in the supernatants. The results of this experiment to determine the optimal initial pH indicated that a lower initial pH value of the protein slurry resulted in a greater reduction in phytate content. This parameter is clearly another which may be varied to control the amount of phytate reduction in the soy protein.

EXPERIMENT NUMBER 13

Figure 10:
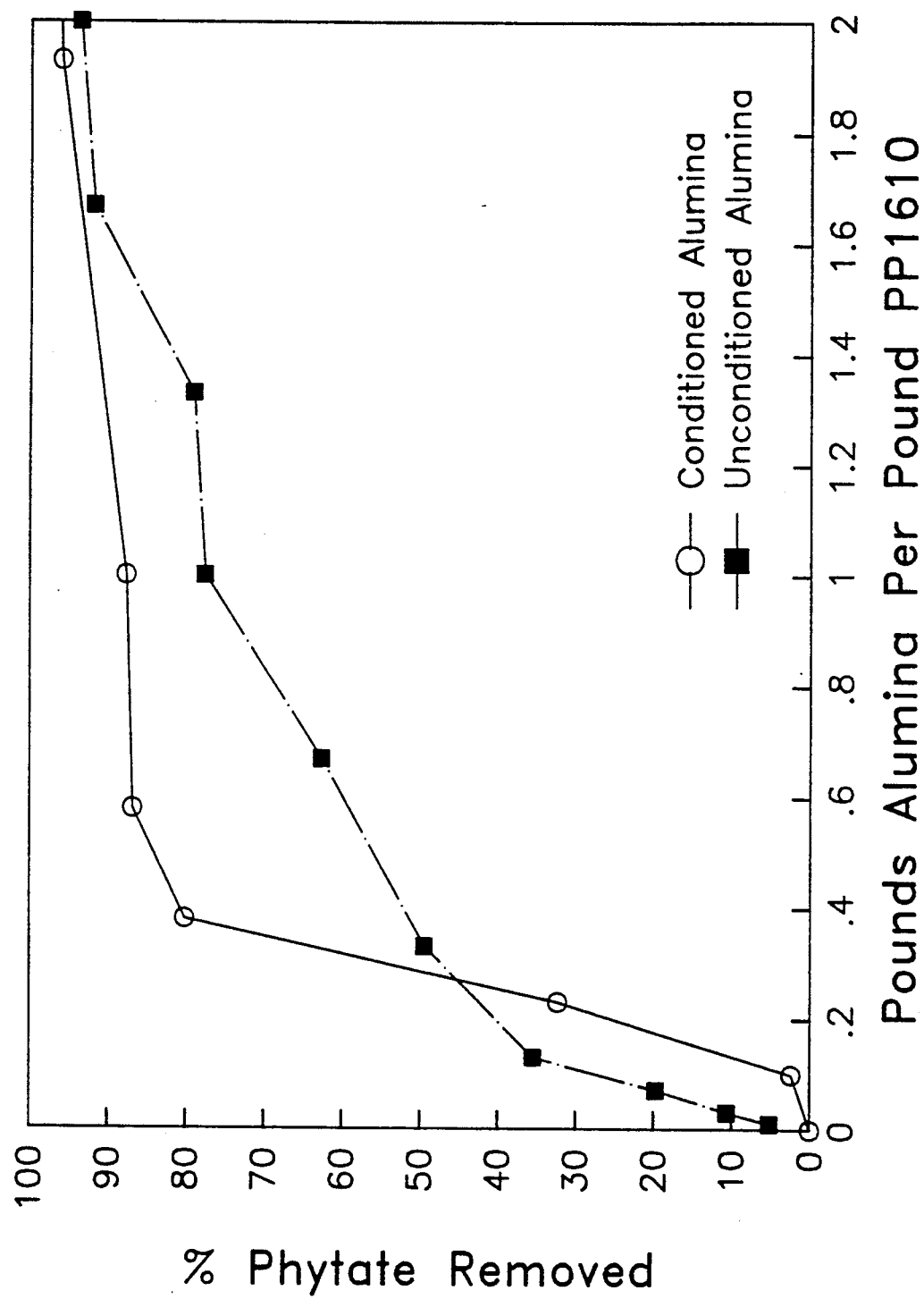
FIG. 10 is a graph showing the effect of the alumina to protein ratio on phytate removal for a soy protein isolate for both conditioned and unconditioned alumina.

This experiment evaluated the effect of soaking the alumina in aluminum sulfate solution prior to addition of the alumina to a protein slurry. Varying amounts of alumina were soaked in 5% aluminum sulfate solution for approximately ten minutes. The aluminum sulfate solution was decanted, and the alumina washed with water. The alumina was added to a 1% PP1610 soy protein isolate slurry, the initial pH was adjusted to 1.5–1.7 with hydrochloric acid, and the slurry was mixed. The secondary pH of the protein slurry was then adjusted to 9.2–9.4 with potassium hydroxide, mixed well, then centrifuged. A determination of phytate was made in the usual fashion, and the phytate removal efficiency was observed to be greater than that of untreated alumina. It was unknown whether this improved attachment efficiency was because of the additional aluminum from the aluminum sulfate or the attached sulfate on the alumina surface. If the increased efficiency of the alumina was caused by the sulfate attachment, the proposed treatment of alumina with sodium hydroxide and sulfuric acid would accomplish the same sulfate attachment. "Conditioned alumina" which had been treated with sodium hydroxide and sulfuric acid was compared with "unconditioned alumina" to determine their relative effectiveness to remove phytate. FIG. 10 shows that the conditioning process improved efficiency of phytate removal by a factor of at least about 4. Although this was a significant improvement, it is unknown whether this is due to the sulfate or aluminum attachment, or a combination of both phenomena.

EXPERIMENT NUMBER 14

Figure 11:
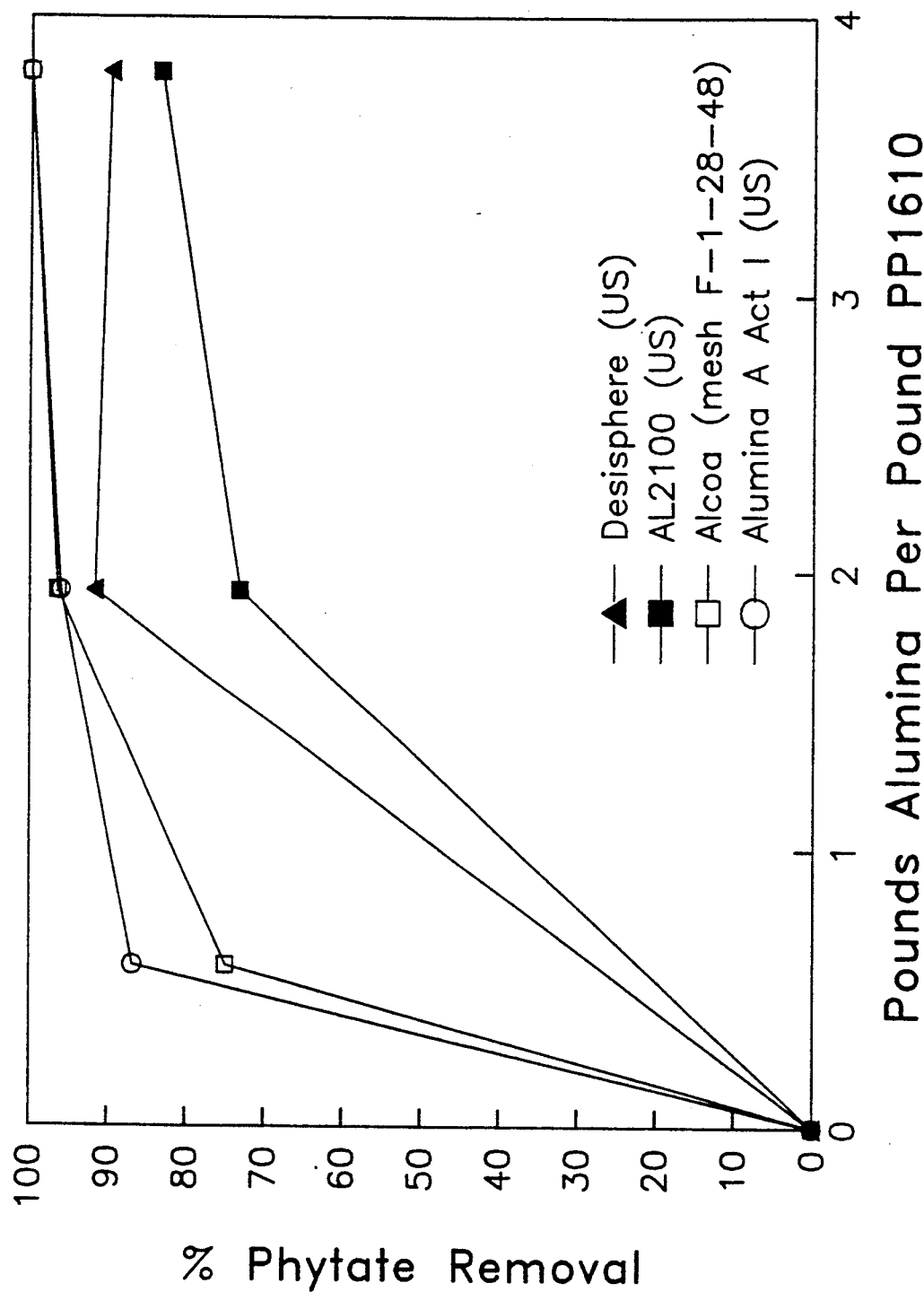
FIG. 11 is a graph showing the effect of a variety of conditioned aluminas on phytate reduction for a soy protein isolate.

The effects of the "conditioning treatment" with sodium hydroxide and sulfuric acid on several alumina types were studied. Universal Scientific Alumina A Act II–III was compared with Alcoa Alumina available from ALCOA, 425 6th Avenue, Pittsburgh, Pa. following treatment with 10% sodium hydroxide/10% sulfuric acid. The "conditioned" aluminas were added to 1% PP1610 in varying amounts at an initial pH of 1.0, mixed well, and then adjusted to a secondary pH 9.2–9.4 with potassium hydroxide. The solutions were centrifuged, and an analysis of phytate content was made. This experiment was repeated with other "conditioned aluminas" such as AL2100 (Universal Scientific) and Desisphere (Universal Scientific). The alumina treatment was also attempted using "conditioned alumina" with no prior pH treatment of the protein slurry. The experiment using "conditioned alumina" with no prior pH treatment of the protein slurry showed no phytate removal. FIG. 11 shows that a number of aluminas were substantially equally effective at removing phytate, allowing a greater degree of freedom in choosing a preferred alumina for this process.

An X-ray fluorescence scan of "conditioned alumina" which had been used was compared with re-used conditioned alumina" and showed that phosphorus did reattach to the surface of both. This suggests that the alumina may be reused and reconditioned many times. It is speculated that reconditioning of spent alumina will yield a cost effective process. The useful lifetime of the alumina in the process using cycles of regenerating and reusing spent alumina has not been determined.

Conditioning (or re-conditioning) of the alumina with sodium hydroxide and sulfuric acid detaches the phytate/phytic acid/phosphorus from the alumina. It is possible that the rinse streams may be treated with phytase enzyme under the correct conditions to yield myo-inositol, another commodity which has nutritional value.

EXPERIMENT NUMBER 15

A bench scale batch of soy protein was again made from soy flour. A 10% soy flour slurry at an initial pH of 1.0 was treated with alumina which had been conditioned with 10% sodium hydroxide/10% sulfuric acid. The slurry mixed for approximately ten minutes before the secondary pH was adjusted to 9.2–9.6 with potassium hydroxide, and then was mixed for an additional forty five minutes. The slurry was centrifuged, the solution was decanted, and its pH was adjusted to 4.5 with hydrochloric acid. The protein was precipitated in the usual way and the liquid was decanted from the top. The protein was washed with water, centrifuged, and freeze dried. This sample was labeled "CAN-3" and subjected to a battery of analyses, the results of which are presented above in Table 5.

Data from this batch of soy protein isolate made from soy flour ("CAN-3") looked very encouraging (Table 6). Since this was the first alumina-treated soy protein isolate which had been washed prior to freeze-drying, mineral levels, and hence ash content, were significantly reduced over alumina-treated protein from earlier experiments. Protein isolate yield from the soy flour starting material was good at over 32% (over 91% of conventional process recovery). The Kjeldahl protein content at 87% was al so good. Aluminum was high for this batch, however, and it is conjectured that alumina fines may have carried over to the protein precipitate portion. This experiment demonstrated the use of the present invention to produce a protein isolate while simultaneously removing phytate.

EXPERIMENT NUMBER 16

In this experiment a bench scale batch of soy protein isolate was prepared using "conditioned" alumina (Universal Scientific Alumina A Act II–III) to treat soy flour. Hydrochloric acid and potassium hydroxide were used for the initial and secondary pH steps as described in Experiment Number 15, and the final protein precipitate was rinsed with water. Samples of the resulting protein, labeled "CAN-4" were subjected to a battery of analyses, the results of which are presented above in Table 5.

The analysis of CAN-4 confirmed a phytate-reduced soy protein isolate. Additionally, the Kjeldahl protein content of the isolate was good. Ash and chloride, as well as mineral content, were high, however, these may be reduced by a better final water rinse of the isolate. The amino acid profile of the alumina-treated soy protein isolate, as set forth in Table 6, was very similar to commercial soy protein.

TABLE 7

| Aluminum:Phytate Molar Ratio | Alumina:Protein Weight Ratio |
|---|---|
| 3.5:1 | 0.01:1 |
| 9.0:1 | 0.03:1 |
| 18:1 | 0.07:1 |
| 36:1 | 0.13:1 |
| 90:1 | 0.33:1 |
| 180:1 | 0.67:1 |
| 275:1 | 1:1 |
| 360:1 | 1.33:1 |
| 450:1 | 1.67:1 |
| 550:1 | 2:1 |

It was then decided to determine the phytate content of the fiber isolated in this experiment. After the centrifugation step (after the pH has been adjusted to 9.2-9.4), the alumina resides at the bottom of the centrifuge tube, and the fiber is the layer directly above the alumina. The fiber was separated from the alumina (mostly by scraping), washed with water, and re-centrifuged. The fiber was then analyzed for its phytate content both as a wet sludge and a freeze dried material and compared with the phytate content of a commercial fiber, Fibrim 300 TM.

As shown above in Table 5 the commercial commodity Fibrim 300 TM is available from Protein Technology International which is a division of Ralston Purina, contains approximately 1% phytate and the fiber produced using the alumina treatment process of soy flour contained less than 0.2% phytate. This represents a significant reduction in phytate content for fiber (>80% reduction), and a major advantage to the alumina treatment process of the present invention.

EXPERIMENT NUMBER 17

Samples of Remy rice protein flour which is available from AB Ingredients, 24 Spielman, Fairfield, N.J. 07004 USA, which is the USA Representative of S.A. Remy Industries B-3018 Wijgmaal-Leuren-Belgium and CNP rice protein which is available from California Natural Products, P.O. Box 1219, Lathrop, Calif. 95330 U.S.A. were treated with alumina. The batch process, similar to that for soy protein isolate, consisted of the addition of alumina at a low initial pH (1.0) to a slurry, raising the pH of the slurry to a secondary pH of 9.2- 9.5, centrifugation, decanting of the supernatant, and precipitation of the rice protein at a pH of 4.5. Samples of the precipitated soluble protein and insoluble materials were analyzed for protein, manganese and phytate content.

Treatment of rice proteins with alumina produced significant results. Although a large portion of the Remy rice protein flour remained insoluble throughout the process, phytate was tested on both the soluble and insoluble components. The untreated Remy rice flour was found to contain approximately 2.2% phytate, while the alumina treated soluble portion contained approximately 0.7% phytate and the alumina treated insoluble component contained no detectable phytate. As the soluble portion of the rice protein flour was only about 3% of the total, this phytate reduction is equivalent to a 99% reduction in phytate in the total Remy rice protein flour. The CNP rice protein contained very little phytate initially (<0.25%), and the alumina treatment appeared to remove virtually all of the phytate that was present. CNP rice protein, however, contains very little (if any) soluble protein. Because of the large amount of insoluble protein/fiber in these rice materials, it is believed that the use of column technology would be more practical.

The alumina treatment of the CNP rice protein was also found to remove manganese. Prior to alumina treatment, CNP rice protein was found to contain 7.62 mg/100 g manganese and have 54% protein (as determined by the Tecator kjeldahl method). After alumina treatment, the CNP rice protein contained 1.94 mg/100 g manganese with a 73% protein content. The removal of manganese from rice protein is considered to be very desirable for its use in nutritional products for infants, such as liquid formulas. It is postulated that the apparent increase in protein content of this rice protein source may be due to washing away of some of the excess minerals found in the raw commercial commodity.

Although data collected from the above experiments was from batch treatment with alumina, column technology is considered to be the preferred process. The most critical issues for column scaleup/applicability would be the size of the alumina particles and the porosity of the bed support. An alumina particle size which is greater than fiber or insoluble protein particle size, combined with a bed support with a pore size less than the particle size of the alumina but greater than the fiber or insoluble protein are critical parameters. The chemistry of alumina indicates that a wide range of aluminas will remove phytate, thus column technology could be used readily for the task.

EXPERIMENT NUMBER 18

The use of column technology for phytate removal from soy proteins was then attempted. A 2" by 24" column constructed of Lexan with a nylon screen and perforated Lexan support was made. Approximately 900 grams of Desisphere (Universal Scientific) alumina was conditioned with 2% sodium hydroxide and 10% sulfuric acid and packed into the column. After rinsing the alumina with water until no alumina fines were visible in the eluant, one liter of a 5% slurry of PP1610 soy protein was passed through the column. The eluant was collected, and the alumina in the column was rinsed with approximately 250 ml of 25% hydrochloric acid. The acid was then recirculated through the column two more times. This eluant was also collected. A water rinse of 250 ml was then taken through the column twice and collected. Individual eluants as well as a combination of all these eluants were then analyzed for phytate content. The column was then rinsed with 250 ml 1 N potassium hydroxide twice. An aliquot of this rinse solution as well as all solutions combined were also tested for phytate content. Total solids were determined for selected samples to achieve a better estimation of actual phytate reduction.

Alumina treatment of PP1610 soy protein isolate using column technology was successful in the lab scale experiment. A reduction in the phytate level of greater than 90% was achieved using column alumina treatment. The process used for column treatment was slightly different from that used for batch treatment of the soy isolate, however. In the alumina batch treatment process, the protein must be separated from the alumina by centrifugation, which results in all insoluble material, including protein, being separated from that which is solubilized. This necessitates maximum resolubilization of the soy protein at a high secondary pH, (9.2-9.6). With an alumina column treatment process, the alumina:phytate contact is made, then the alumina is separated from the protein—both soluble and insoluble—by process design. Therefore, no increase in pH is necessary to resolubilize the protein. Acid and water rinses recover any material remaining in the column proper. The treated slurry can then be adjusted to a pH of approximately 4.5 to precipitate the protein. The protein isolate can be rinsed with water to lower mineral content and subsequently can be spray-dried or used as a wet curd. The mineral content of the protein isolate would be lower using this column treatment process than in the batch treatment process since less potassium hydroxide and less hydrochloric acid are used. Theoretically, the only protein loss should be from that protein which remains attached to the alumina via the phytate (approximately the phytate content of the material). If it is desirable to recover this 1%-3% of the protein, a 1 N potassium hydroxide wash should resolubilize (recover) the protein while allowing the phytate to remain on the alumina. The potential drawback of this method may be increased lysinoalanine formation due to the momentary high pH of the potassium hydroxide solution.

Aluminum levels varied for all alumina-treated batches of soy protein. The increase in alumina can be explained in several ways: alumina fines, dissolved aluminum, etc. Alumina fines could be eliminated by process design—for example, washing them from the column by back-flushing. If the problem was dissolved aluminum, a filter which is commercially available from CUNO, Inc., could be used to scavenge it.

EXPERIMENT NUMBER 19

Conditioning of alumina using potassium and calcium sulfate instead of sulfuric acid was evaluated. As it was believed that the low pH of the sulfuric acid treatment may cause alumina particle degradation, the relatively neutral pH of a sulfate salt treatment may prove beneficial for stability of the alumina particle. Soy protein isolate was treated with varying levels of alumina which had been conditioned with sodium hydroxide and potassium sulfate for comparison with samples treated with sodium hydroxide and sulfuric acid-treated alumina. A sample was analyzed for calcium, phosphorus, and protein content and compared to an untreated "control" sample.

Figure 12:
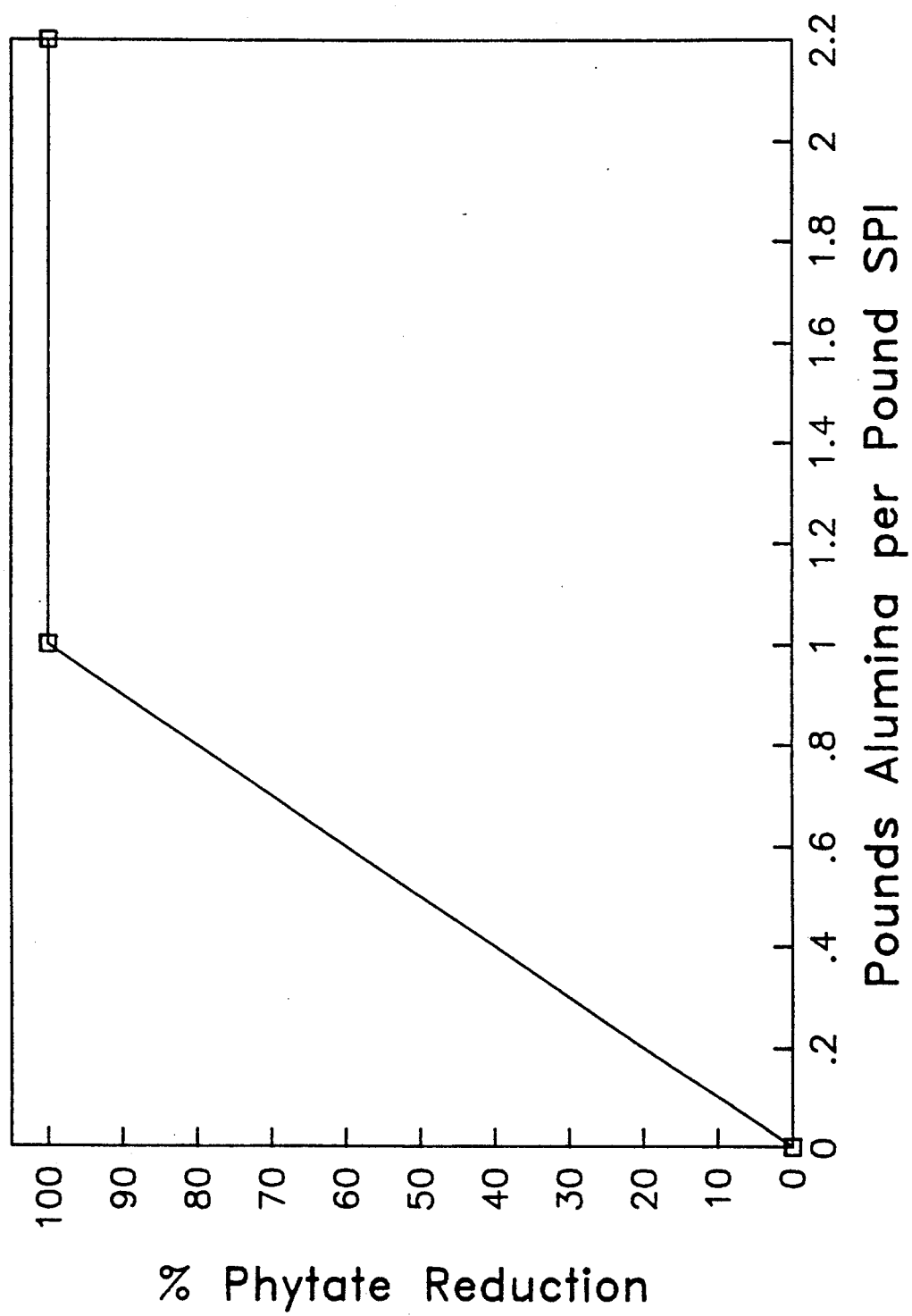
FIG. 12 is a graph showing the effect of using various materials to treat alumina on phytate removal from soy protein.

Results of trials using potassium sulfate-treated alumina for phytate removal from soy protein are presented in FIG. 12. This figure illustrates significant phytate removal from the starting material with minimal protein loss. This experiment proved the utility of alumina treated with a potassium sulfate solution for separating phytate from soy protein.

EXPERIMENT NUMBER 20

Additional trials were performed to determine the effects of the initial sodium hydroxide conditioning of alumina. Since other sulfate salts had shown effectiveness in previous experiments, eliminations of the alkaline rinse with sodium hydroxide would further lessen the harsh treatment of the alumina particle, minimizing its degradation. Alcoa Alumina F-200 and Selecto ABA-6000N were conditioned with, and without, a 2% sodium hydroxide rinse prior to potassium sulfate treatment. 1% PP1610 soy protein isolate slurries were then treated with both conditioned aluminas (with and without sodium hydroxide pretreatment), and with Alcoa Alumina F-200 and Selectro (Selecto, Inc. Atlanta, Ga.) ABA-6000N which had been rinsed with water. Phytate determinations were made on all samples and were compared with an untreated control sample.

Table 8 shows the results of the use of sodium hydroxide in the alumina conditioning process for the removal of phytate from soy protein. As these aluminas had not previously been evaluated for phytate removal, alumina:protein ratios were not optimal, with only 55% to 65% phytate removed. (This reduction can be undoubtedly increased with increased alumina:protein ratios.) While these results indicate that a sodium hydroxide pretreatment prior to sulfate conditioning does improve the effectiveness of the Alcoa Alumina F-200 and Selecto ABA-6000N for phytate removal from soy protein, significant phytate reduction still occurs without the caustic alumina treatment.

TABLE 8

| Effect of Sodium Hydroxide in Alumina Conditioning | | |
|---|---|---|
| Alumina Type/ Conditioned With | Sodium Hydroxide Used in Conditioning | Phytate Removal from SPI |
| Alcoa F-200/"as is" | no | 36.9% |
| Alcoa F-200/$K_2SO_4$ | no | 55.7% |
| Alcoa F-200/$K_2SO_4$ | yes | 64.6% |
| Selecto ABA-6000N/ "as is" | no | 30.1% |
| Selecto ABA-6000N/ $K_2SO_4$ | no | 54.9% |
| Selecto ABA-6000N/ $K_2SO_4$ | yes | 59.6% |

While certain representative embodiments and details have been described for the purpose of illustrating the invention, it will be apparent to those skilled in the art that various changes and modifications may be made therein without departing from the spirit or scope of the invention.

We claim:

1. A method of separating manganese from rice protein comprising the steps of:
   (a) providing an aqueous slurry containing rice protein;
   (b) causing the slurry to contact particles of alumina for a period of time, with the slurry for at least a portion of the contact period to have a pH of not greater than about 6; and thereafter
   (c) adjusting the pH of the slurry to be greater than about 9.

2. A method of separating manganese from rice protein according to claim 1 wherein step (b) comprises placing alumina particles in said slurry.

3. A method of separating manganese from rice proteins according to claim 1 wherein step (b) comprises causing the slurry to pass through a column which contains alumina particles and has at least one inlet and one outlet.

4. A method of separating manganese from rice protein according to any one of claims wherein the particles of alumina have been conditioned by exposing said particles to a sulfate solution.

5. A method of separating manganese from rice protein according to claim 4 wherein the sulfate solution has a pH which is basic.

6. A method of separating manganese from rice protein according to any one of claims 1, 2, or 3 further comprising the step (d) of reconditioning the particles of alumina by exposing the particles to a sulfate solution following step (c) and thereafter repeating steps (a) through (c) using the reconditioned particles of alumina in step (b).

* * * * *

UNITED STATES PATENT AND TRADEMARK OFFICE
CERTIFICATE OF CORRECTION

PATENT NO. : 5,306,810
DATED      : April 26, 1994
INVENTOR(S) : T. Mazer, C. Nardelli, A. Hogarth, A. Krzykowski It is certified that error appears in the above-identified patent and that said Letters Patent is hereby corrected as shown below:

Column 22, line 55, "claims wherein" should be -- claims 1, 2 or 3 wherein--.

Signed and Sealed this

Second Day of August, 1994

Attest:

BRUCE LEHMAN

Attesting Officer

Commissioner of Patents and Trademarks